United States Patent
Klimovich et al.

(10) Patent No.: US 11,282,225 B2
(45) Date of Patent: Mar. 22, 2022

(54) CALIBRATION FOR VISION IN NAVIGATION SYSTEMS

(71) Applicant: Mapbox, Inc., San Francisco, CA (US)

(72) Inventors: Andrei Klimovich, Minsk (BY); Dzianis Karonchyk, Minsk (BY); Dzianis Kanonik, Minsk (BY)

(73) Assignee: Mapbox, Inc., Washington, DC (US)

( * ) Notice: Subject to any disclaimer, the term of this patent is extended or adjusted under 35 U.S.C. 154(b) by 19 days.

(21) Appl. No.: 16/566,831

(22) Filed: Sep. 10, 2019

(65) Prior Publication Data

US 2020/0082565 A1 Mar. 12, 2020

Related U.S. Application Data

(60) Provisional application No. 62/384,370, filed on Apr. 15, 2019, provisional application No. 62/729,401, filed on Sep. 10, 2018.

(51) Int. Cl.
*G06T 7/73* (2017.01)
*G06T 7/269* (2017.01)
(Continued)

(52) U.S. Cl.
CPC ............ *G06T 7/73* (2017.01); *G01C 21/30* (2013.01); *G06F 16/29* (2019.01); *G06F 16/587* (2019.01);
(Continued)

(58) Field of Classification Search
CPC .... G01C 21/30; G01C 21/32; G01C 21/3602; G01C 21/3697; G01S 19/13; G01S 5/16;
(Continued)

(56) References Cited

U.S. PATENT DOCUMENTS

| 10,300,851 | B1 | 5/2019 | Kim et al. |
| 2010/0172469 | A1 | 7/2010 | Poulsen et al. |

(Continued)

FOREIGN PATENT DOCUMENTS

| JP | 2010/245628 A | 10/2010 |
| KR | 10-2011-0065057 A | 6/2011 |

(Continued)

OTHER PUBLICATIONS

Chaurasia, A. et al., "LinkNet: Exploiting Encoder Representations for Efficient Semantic Segmentation," Microsoft Research, Jun. 14, 2017, [retrieved on Jun. 9, 2020]. Retrieved from <URL: https://www.researchgate.net/publication/318392562_LinkNet_Exploiting_Encoder_Representations_for_Efficient_Semantic_Segmentation>, pp. 1-5.

(Continued)

*Primary Examiner* — Bobbak Safaipour
(74) *Attorney, Agent, or Firm* — Fenwick & West LLP

(57) ABSTRACT

A computer-implemented method includes receiving a video comprising image frames depicting multiple objects. The video is captured by a video capture device moving relative to the surface of the Earth while the video is captured. A geographic location of the video capture device is received for each of the image frames and an angular orientation of the video capture device is determined based on the image frames. The determining the angular orientation includes determining a line in the image frames of the video for each object of a plurality of the multiple objects. The determined line corresponds to two-dimensional positions of the object in the image frames. The computer-implemented method includes determining a vanishing point of the image frames based on the determined lines and determining the angular orientation of the video capture device based on the determined vanishing point.

20 Claims, 16 Drawing Sheets

(51) Int. Cl.

| | | |
|---|---|---|
| *G06T 7/12* | (2017.01) | |
| *G06K 9/00* | (2006.01) | |
| *G06T 11/00* | (2006.01) | |
| *G01C 21/30* | (2006.01) | |
| *G06F 16/587* | (2019.01) | |
| *G06F 16/29* | (2019.01) | |
| *G01S 19/13* | (2010.01) | |

(52) U.S. Cl.
CPC ..... *G06K 9/00791* (2013.01); *G06K 9/00798* (2013.01); *G06T 7/12* (2017.01); *G06T 7/269* (2017.01); *G06T 7/74* (2017.01); *G06T 11/00* (2013.01); *G01S 19/13* (2013.01); *G06T 2207/10016* (2013.01); *G06T 2207/20076* (2013.01); *G06T 2207/20081* (2013.01); *G06T 2207/20084* (2013.01); *G06T 2207/30244* (2013.01); *G06T 2207/30252* (2013.01); *G06T 2207/30256* (2013.01)

(58) Field of Classification Search
CPC ........ G06F 16/29; G06F 16/51; G06F 16/587; G06F 16/739; G06K 9/00791; G06K 9/00798; G06T 11/00; G06T 2207/10016; G06T 2207/20076; G06T 2207/20081; G06T 2207/20084; G06T 2207/30244; G06T 2207/30252; G06T 2207/30256; G06T 7/12; G06T 7/269; G06T 7/73; G06T 7/74

See application file for complete search history.

(56) References Cited

U.S. PATENT DOCUMENTS

| | | | |
|---|---|---|---|
| 2010/0295948 A1* | 11/2010 | Xie | G06T 7/80 |
| | | | 348/175 |
| 2011/0115912 A1* | 5/2011 | Kuehnle | G06K 9/00798 |
| | | | 348/148 |
| 2011/0182475 A1 | 7/2011 | Fairfield et al. | |
| 2012/0296561 A1 | 11/2012 | Park et al. | |
| 2015/0125073 A1 | 5/2015 | Hwang et al. | |
| 2017/0061623 A1 | 3/2017 | Jaehnisch et al. | |
| 2017/0098129 A1 | 4/2017 | Lo et al. | |
| 2018/0172840 A1 | 6/2018 | Fenton et al. | |
| 2018/0188372 A1 | 7/2018 | Wheeler | |
| 2018/0300880 A1 | 10/2018 | Fan et al. | |
| 2018/0306590 A1 | 10/2018 | Li | |
| 2018/0322648 A1* | 11/2018 | Lu | G06K 9/6269 |
| 2018/0336424 A1 | 11/2018 | Jang et al. | |
| 2018/0357509 A1* | 12/2018 | Dlugosz | G06K 9/3233 |
| 2018/0357791 A1* | 12/2018 | Dworakowski | G06T 7/80 |
| 2018/0365858 A1* | 12/2018 | Kim | H04N 7/181 |
| 2019/0011921 A1 | 1/2019 | Wang et al. | |
| 2019/0042883 A1 | 2/2019 | Park et al. | |
| 2019/0050681 A1 | 2/2019 | Tate | |
| 2019/0147622 A1* | 5/2019 | Li | B64C 39/024 |
| | | | 382/154 |
| 2019/0266752 A1* | 8/2019 | Dlugosz | G06T 7/74 |
| 2019/0272433 A1 | 9/2019 | Yu et al. | |
| 2019/0325602 A1 | 10/2019 | Ondruska et al. | |
| 2019/0340746 A1 | 11/2019 | Lu et al. | |
| 2019/0384303 A1 | 12/2019 | Muller et al. | |
| 2019/0392212 A1 | 12/2019 | Sawhney et al. | |
| 2020/0082178 A1* | 3/2020 | Ahn | G06K 9/00798 |
| 2020/0104607 A1* | 4/2020 | Kim | G06K 9/6218 |
| 2020/0126239 A1 | 4/2020 | Qian et al. | |
| 2020/0218913 A1 | 7/2020 | Unnikrishnan et al. | |
| 2020/0242391 A1* | 7/2020 | Takahashi | G06T 5/00 |
| 2020/0249684 A1 | 8/2020 | Onofrio et al. | |
| 2020/0257930 A1 | 8/2020 | Nahr | |
| 2021/0310807 A1* | 10/2021 | Demir | G06T 17/05 |

FOREIGN PATENT DOCUMENTS

| | | |
|---|---|---|
| KR | 10-1163446 B1 | 7/2012 |
| WO | WO-2017/116570 A1 | 7/2017 |

OTHER PUBLICATIONS

He, K. et al., "Deep Residual Learning for Image Recognition," https://arxiv.org/abs/1512.03385v1, Dec. 10, 2015, [retrieved on Jun. 9, 2020]. Retrieved from: <URL: https://arxiv.org/abs/1512.03385v1>, pp. 1-12.

International Search Report and Written Opinion, Patent Cooperation Treaty Application No. PCT/US2019/050258, dated Dec. 30, 2019, 13 pages.

International Search Report and Written Opinion, Patent Cooperation Treaty Application No. PCT/US2020/018691, dated Jun. 18, 2020, 11 pages.

United States Office Action, U.S. Appl. No. 16/354,108, filed Sep. 30, 2020, eight pages.

PCT International Search Report and Written Opinion, PCT Patent Application No. PCT/US2019/050489, dated Dec. 30, 2019, 11 pages.

United States Office Action, U.S. Appl. No. 16/564,701, filed Feb. 12, 2021, 39 pages.

United States Office Action, U.S. Appl. No. 16/564,701, filed Aug. 25, 2021, 27 pages.

* cited by examiner

CALIBRATION FOR VISION IN NAVIGATION SYSTEMS

CROSS-REFERENCE TO RELATED APPLICATIONS

This application claims priority to U.S. Provisional Patent Application No. 62/729,401, filed on Sep. 10, 2018, and to U.S. Provisional Patent Application No. 62/834,370, filed on Apr. 15, 2019, which are hereby incorporated in their entirety.

BACKGROUND

This disclosure generally relates to associating objects depicted in videos with geographic locations.

When a video capture device, e.g. a video camera on a smartphone, captures video of objects (e.g., a street sign, a tree, or a building) in a geographic area, there is uncertainty regarding the precise geographic location of objects captured in the image, even when the geographic location of the video capture device is known at the time the video is captured. For example, even if a video camera has a known location, that does not inherently provide a location of a particular building in image frames captured by the video camera.

The ability to efficiently identify the locations of objects in captured video would be desirable for a number of purposes, such as populating a map with the locations of the objects. One challenge in identifying the geographic location is determining an angular orientation of the video capture device. Other challenges include determining the geographic locations of objects in videos, without the need for resource-intensive calculations.

SUMMARY

A computer-implemented method for determining the geographic locations of objects depicted in image frames of a video includes receiving a video comprising image frames depicting multiple objects. The video capture device that captured the video may be moving relative to the surface of the Earth while the video was captured, according to some embodiments. A geographic location of the video capture device is received for each of the image frames. The video capture device may be associated with a mobile computing device (e.g., the video capture device may be a camera integrated into a smartphone). The video capture device may also be associated with a vehicle. In some embodiments, the received geographic location of the video capture device is specified relative to a geographic location of the vehicle.

In order to determine the geographic locations of the objects, an angular orientation of the video capture device is determined based on the image frames. Determining the angular orientation includes determining a line in the image frames of the image capture device for each of a plurality of the multiple objects. The determined line corresponds to two-dimensional positions of the object in the image frames. For example, one of the determined lines may be an optical flow line that approximates the optical flow of the object through the image frames. One of the determined lines may also be a segmentation line that is generated based on a determined orientation of a segmentation object that corresponds to an approximately straight line (e.g., a road marker). A vanishing point of the image frames is determined based on the determined lines. In further embodiments, the vanishing point is determined based on an estimated intersection point of the determined lines. The angular orientation of the video capture device is then determined based on the determined vanishing point. In some embodiments, based on the determined angular orientation of the video capture device, the received geographic location of the video capture device, and determined two-dimensional positions of the objects in the image frames, the geographic locations of the objects depicted in the image frames of the video are determined.

The figures depict embodiments of the present disclosure for purposes of illustration only. One skilled in the art will readily recognize from the following description that alternative embodiments of the structures and methods illustrated herein may be employed without departing from the principles or benefits of the disclosure described herein.

DETAILED DESCRIPTION

System Overview

Figure 1:
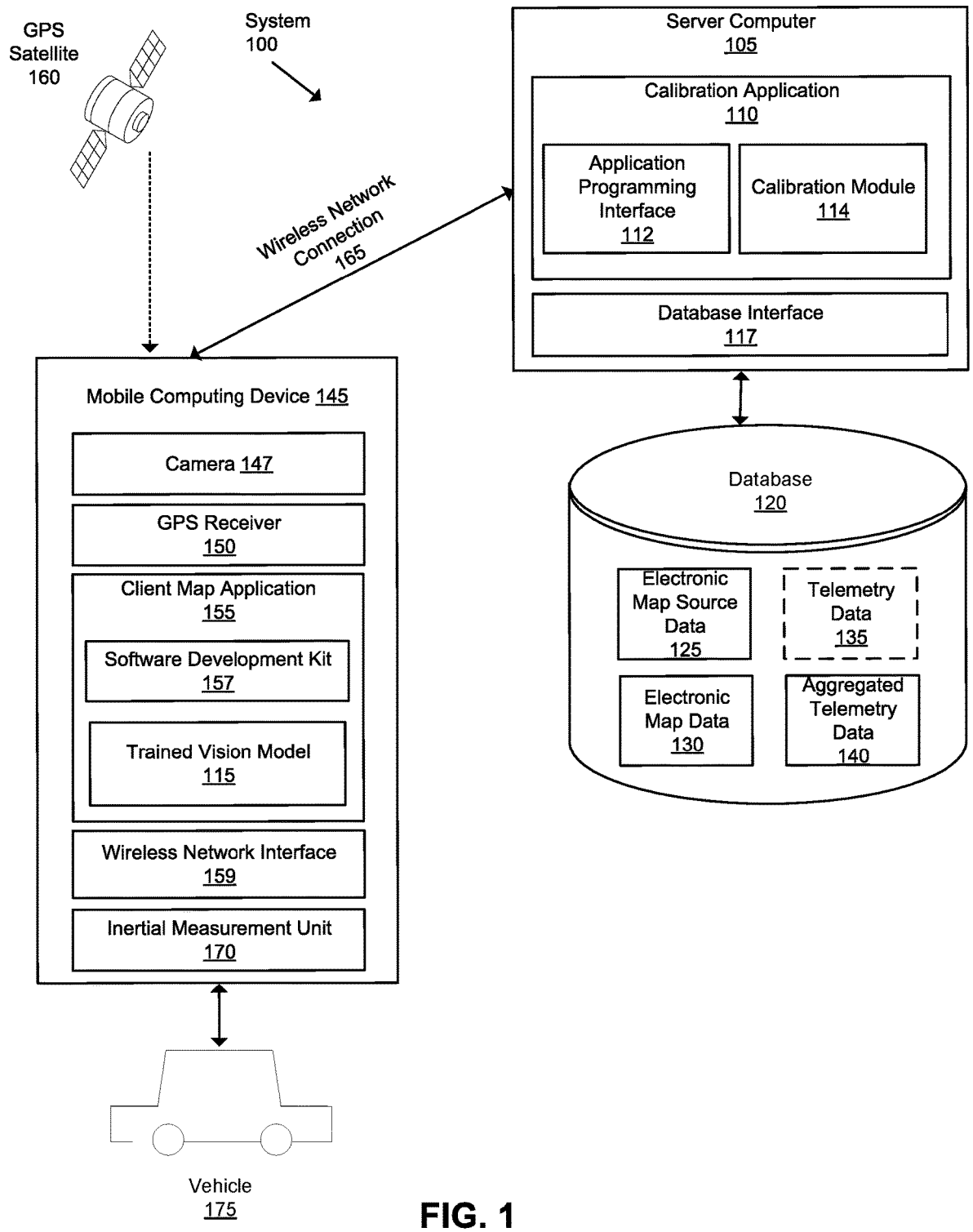
FIG. 1 is a block diagram of a system environment, in accordance with some embodiments.

FIG. 1 illustrates an example computer system in which the techniques described may be practiced, in accordance with some embodiments.

A computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer 105 comprises a calibration application 110, an application programming interface (API) 112, a calibration module 114, and a database interface 117. The database 120 comprises electronic map source data 125, electronic map data 130, telemetry data 135, and aggregated telemetry data 140. The mobile computing device 145 comprises a camera 147, a GPS receiver 150, a client map application 155, a wireless network interface 159, and an inertial measurement unit 170. The client map application 155 includes the calibration module 114 and a software development kit (SDK) 157. The client map application 155 is hosted by the mobile computing device 145, and runs the calibration module 114. The client map application 155 and/or the vision application 110 use the output of the calibration module 114 in a number of ways, as discussed in the following sections.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute vision application 110, and may include other applications, software, and other executable instructions, such as database interface 117, to facilitate various aspects of embodiments described herein.

Database interface 117 is a programmatic interface such as JDBC or ODBC for communicating with database 120. Database interface 117 may communicate with any number of databases and any type of database, in any format. Database interface 117 may be a piece of custom software created by an entity associated with the vision application 110, or may be created by a third-party entity in part or in whole.

Database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

Electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

Electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

Telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

Aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

Mobile computing device 145 is any mobile computing device, such as a laptop computer, hand-held computer, wearable computer, cellular or mobile phone, portable digital assistant (PDA), or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS receiver 150. GPS receiver 150 is a receiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use WiFi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device.

Mobile computing device 145 also includes a camera device 147, also referred to herein as a "video capture device." The camera 147 may be external, but connected, to the mobile computing device 145. Alternatively, the camera 147 may be an integrated component of the mobile computing device 145. Camera 147 functionality may include the capturing of infrared and visible light. In some embodiments, the camera 147 is coupled to a vehicle, such as a car. In some embodiments, the GPS receiver 150 is not physically coupled to the mobile computing device 145 and may be external to the mobile computing device 145. In some embodiments, the GPS receiver 150 is not physically coupled to the camera 147 and is external to the camera 147.

Mobile computing device 145 may include a client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In the server computer 105, the calibration application 110 provides the API 112 that may be accessed, for example, by client map application 155 using SDK 157 to provide electronic mapping to client map application 155. Specifically, the calibration application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, and any other aspects of embodiments described herein.

The calibration application 110 also includes the calibration module 114. The calibration module 114 receives video data from the camera 147. In one embodiment, the client map application 155 may also receive processed image frames of the video data from the calibration module 114. In some embodiments, the calibration module 114 is configured to output a geographic coordinate for an object (e.g., a street sign) detected in image frames of the received video data. As discussed below, the calibration module 114 may have other outputs, such as an estimated angular orientation of the camera 147.

According to one embodiment, the techniques described herein are implemented by one or more special-purpose computing devices. For example, the server computer 105 and the mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
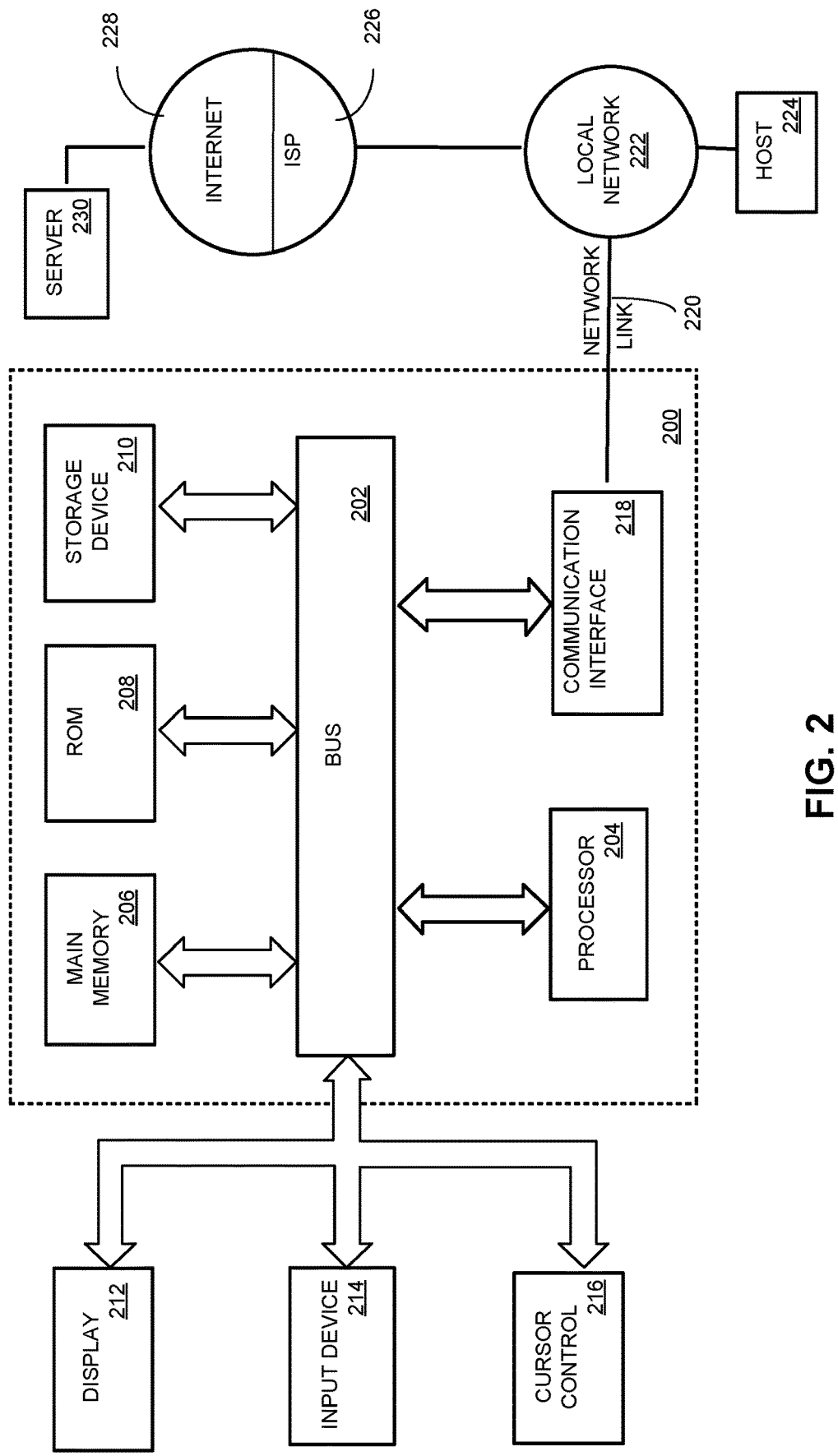
FIG. 2 is an example of a computing device, in accordance with some embodiments.

FIG. 2 is an example of a computing device, in accordance with some embodiments. The computing device 200 may be used as part of the mobile computing device 145, the server computer 105, other components of the system 100, or some combination thereof. Computing device 200 includes a bus 202 or other communication mechanism for communicating information, and a hardware processor 204 coupled with bus 202 for processing information. Hardware processor 204 may be, for example, a general purpose microprocessor.

Computing device 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computing device 200 into a special-purpose machine that is customized to perform the operations specified in the instructions.

Computing device 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computing device 200 may be coupled via bus 202 to a display 212, such as a cathode ray tube (CRT), LCD screen, LED screen, or touch screen, for displaying information to a computer user. An input device 214, which may include alphanumeric and other keys, buttons, a mouse, a touchscreen, or other input elements, is coupled to bus 202 for communicating information and command selections to processor 204. In some embodiments, the computing device 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computing device 200 may implement the techniques described herein using customized hard-wired logic, one or more ASICs or FPGAs, firmware and/or program logic which in combination with the computer system causes or programs computing device 200 to be a special-purpose machine. According to one embodiment, the techniques herein are performed by computing device 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computing device 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computing device 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computing device 200, are example forms of transmission media.

Computing device 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Calibration Module

Figure 3:
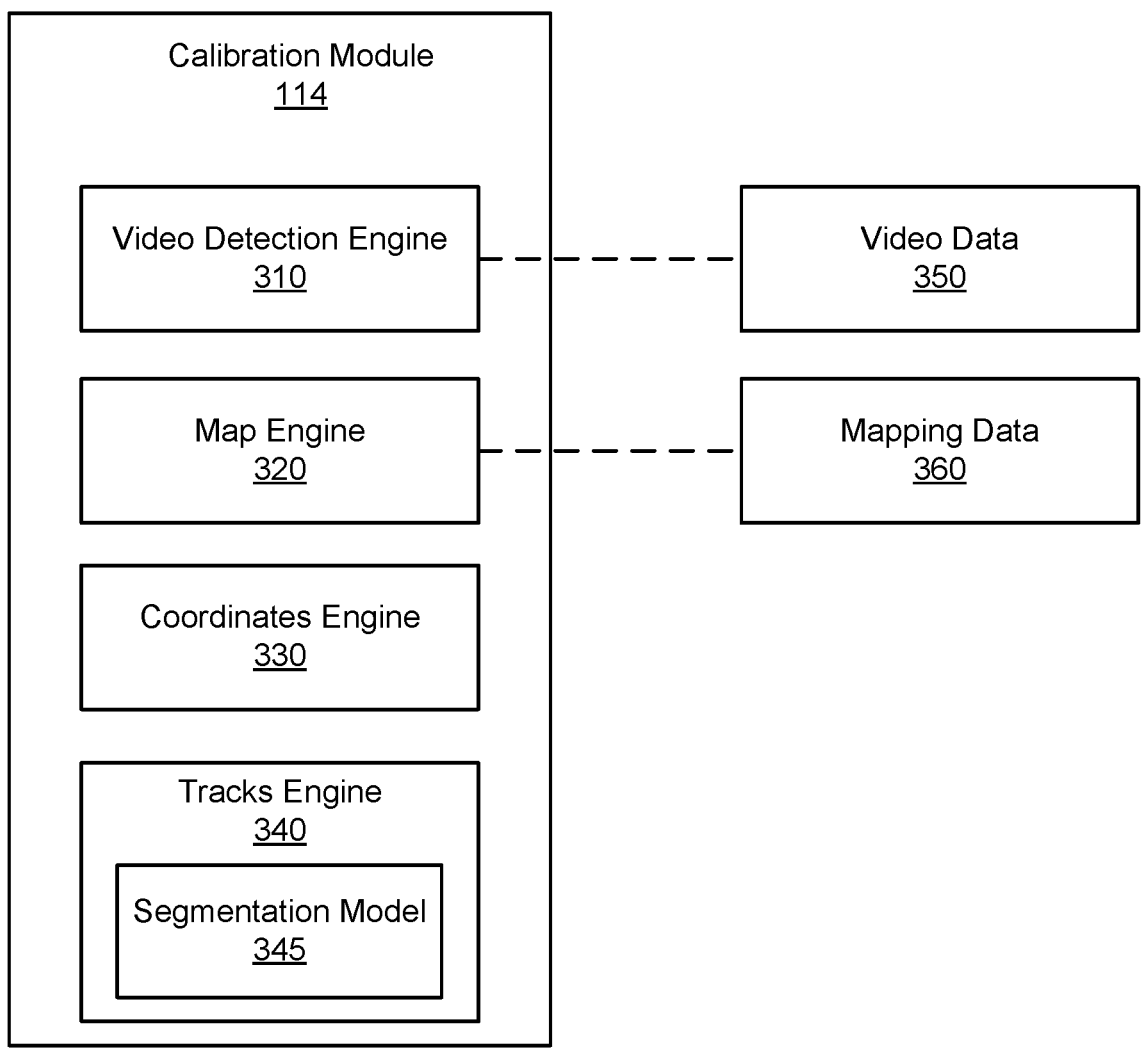
FIG. 3 is a block diagram illustrating a calibration module, according to some embodiments.

FIG. 3 is a block diagram illustrating a calibration module 114 of the server computer 105, in accordance with some embodiments. The calibration module 114 includes a video detection engine 310, a map engine 320, a coordinates engine 330, and a tracks engine 340. The video detection engine 310 receives video data 350, such as a video captured by the camera 147. The video includes a plurality of image frames, each image frame depicting a local environment of the camera. Each image frame is a two-dimensional image with a predefined size. For example, each image frame of the video may have dimensions of 1,920 pixels by 1,080 pixels. Each pixel of an image frame may have corresponding pixel coordinates indicating a row and a column of the image frame where the pixel is located, according to some embodiments.

The video data 350 received by the video detection engine 310 also includes metadata for the video, including a focal length of the camera 147. In some embodiments, the metadata includes sensor data indicating an acceleration of the camera 147 during the capture of the video. The GPS data may be provided to the map engine 320. The metadata may also include other information, such as timestamps indicating the time at which the video is captured (e.g., a time at which the capture was initiated). In other embodiments, each image frame of the video may be associated with a timestamp. In some embodiments, the metadata includes an angular orientation of the camera 147 at the time the video is captured. For example, if the camera 147 has a sensor that records data on the angular orientation of the camera 147, the data from the sensor may be included in the metadata. In such embodiments, the angular orientation need not be expressly calculated (e.g., as at step 1330 of FIG. 13).

The video detection engine 310 detects objects depicted in the received video. The video detection engine 310 also determines object pixel coordinates indicating the relative two-dimensional position of the object, for each image frame the object appears in. The video detection engine 310 may determine a bounding box corresponding to the object for each image frame the object appears in. In this case, the video detection engine 310 generates object pixel coordinates for the bounding box. In other embodiments, the position of the object is represented by other methods. The video detection engine 310 provides the object pixel coordinates to the coordinates engine 330. The video detection engine 310 may also provide a type of object for the detected object (e.g., a car, a sign, or a traffic light).

The video detection engine 310 may use a trained machine learning model to detect the objects in the received video. For example, the video detection engine 310 may detect the objects in the received video and determine the object pixel coordinates using a trained object detection model. In this case, the image frames of the video are inputted to the object detection model, which outputs a bounding box for the detected object and a corresponding type of object. The video detection engine 310 may also determine other information about the object. For example, the video detection engine 310 may determine the type of object, a size of the object, a color of the object, or some combination thereof. The size of the object may be estimated, for example, based on the type of the object, as determined by the object detection model.

The map engine 320 receives mapping data 360 from the electronic map data 130 based on the oblique image data. The mapping data 360 includes a map tile including map data corresponding to geographic coordinates. The geographic coordinates may include at least coordinates that correspond to geographic locations in the vicinity of the mobile computing device 145. When a geographic location of an object in the video is determined, the map engine 320 may modify the received mapping data 360 to indicate the geographic coordinates of the object on the map tile. In some embodiments, the map engine 320 then sends the modified mapping data to the database 120 to update the electronic map data 130 with the geographic coordinates of the object. The map tile may include local East, North, Up (ENU) coordinates for the geographic locations in a local tangent plane of the Earth that corresponds to the vicinity of the camera 147.

The mapping data 360 also includes geographic coordinates indicating the geographic location of the camera 147 at the time a received video is captured by the camera 147. This may be included as GPS data at the time the video was captured. The GPS data may be generated by using the GPS receiver 150 of the mobile computing device 145. In some cases, the geographic location of the camera 147 is the same as that of the mobile computing device 145, but in other cases, the camera 147 may not be local to (e.g., part of, connected to) the mobile computing device 145. In other embodiments, the geographic coordinates of the camera 147 are provided from another source, for example from the database 120. The geographic coordinates of the camera 147 may also include timestamps to indicate a time at which the camera 147 was at the location indicated by the geographic coordinates. In some embodiments, each geographic coordinate is associated with an image frame of a video based on the timestamp.

In some embodiments, the GPS data indicates the geographic location of a vehicle associated with the camera 147. In this case, the location of the camera 147 may be approximated by the location of the vehicle. In other embodiments, the position of the camera 147 relative to the vehicle may be received by the map module 320.

The geographic coordinates may be in the form of geographic latitude and longitude coordinates for the camera 147. Alternatively, the geographic coordinates may be in the form of local ENU coordinates of the camera 147, in a local tangent plane corresponding to the vicinity of the camera 147. In some embodiments, both the geographic latitude and longitude of the camera 147 and the local ENU coordinates of the camera 147 are received by the map module 320.

The coordinates engine 330 receives the object pixel coordinates from the video detection engine 310 and the geographic coordinates for the camera 147 from the map module 320. In some embodiments, the calibration module 114 does not include the video detection engine 310, and the object pixel coordinates are received from an external source. The coordinates engine 330 determines object geographic coordinates indicating the geographic location of the object corresponding to the object pixel coordinates, based on the object pixel coordinates, the device coordinates, and an angular orientation of the camera 147 associated with the video. In some embodiments, a size of the object (e.g. a height of the object) is also received by the coordinates engine 330. In this case, the distance to the object from the camera 147 may be determined based on the size of the object. The size of the object may be determined, for example, by the video detection engine 310. In other embodiments, a distance from the camera to the object is received by the coordinates engine 330. In this case, a size of the object (e.g. a height of the object) may be determined based on the distance from the camera to the object. If the object is detected to be on the ground plane, the coordinates engine 330 may determine the distance to the object from the camera 147 based on the image frames. The determining of the object geographic coordinates may also be based on the size of the object or based on the distance to the object from the camera.

The object geographic coordinates are in the form of geographic latitude and longitude coordinates, according to some embodiments. The object geographic coordinates may be provided to the map engine 320. The map engine 320 may update the map tile to indicate the locations in a map tile of the objects detected in the video by the video detection engine, based on the determined object geographic coordinates. In some embodiments, the map engine 320 also provides the object geographic coordinates to the database 120, updating the electronic map data 130.

The tracks engine 340 may determine the angular orientation of the camera 147 at the time the video is captured, based on the image frames of the video. In other embodiments, the angular orientation is received by the coordinates engine 330 from an external source, such as in the metadata of the video. The tracks engine 340 may determine the angular orientation of the camera 147 based on an estimated vanishing point in the image frames of the video. The vanishing point is estimated based on tracks generated by the tracks engine 340 for the image frames. Each track is a line in the image frames of the video. The generated tracks may include lines that correspond to parallel lines in the real-world environment of the camera 147 depicted by the video. The vanishing point of an image frame corresponds to a point of intersection for lines in the image frame that correspond to parallel lines in the real-world environment. Therefore, the approximate intersection of the generated tracks is estimated as the vanishing point of the image frames.

The tracks engine 340 generates the tracks for the image frames of the video. In some embodiments, the tracks engine 340 determines the optical flow of an object as the object's position changes between image frames, based on the object pixel coordinates for each image frame the object appears in. The optical flow is a trajectory of apparent motion of the object in a visual scene captured in the video caused by the relative motion between the camera and the scene. The tracks engine 340 generates an optical flow track corresponding to the determined optical flow of the object.

In other embodiments, the tracks engine 340 uses a trained segmentation model 345 to identify objects in the image frames that are connected in approximately a straight line. For example, the segmentation model 345 may identify a series of lane markers on a road that approximately form a straight line. The tracks engine 340 generates segmentation tracks corresponding to the objects connected in approximately a straight line. In some embodiments, the tracks engine 340 estimates the vanishing point based on both the optical flow tracks and the segmentation tracks.

The tracks engine 340 determines the vanishing point of the video based on an approximate intersection point of multiple tracks generated based on the image frames of the video. Not all of the generated tracks may intersect at a single point. Therefore, the tracks engine determines an approximate intersection point of the tracks. The tracks engine 340 may determine the approximate intersection point based on a point with a minimum sum of distances to each of the generated tracks. In some embodiments, the track model optimizes the estimation of the vanishing point to determine an accurate vanishing point. The determining of the vanishing point of the video by the tracks engine 340 is discussed in further detail below, with respect to FIGS. 11A-11D.

Pixel, Camera, and Relational Coordinates

Figure 4:
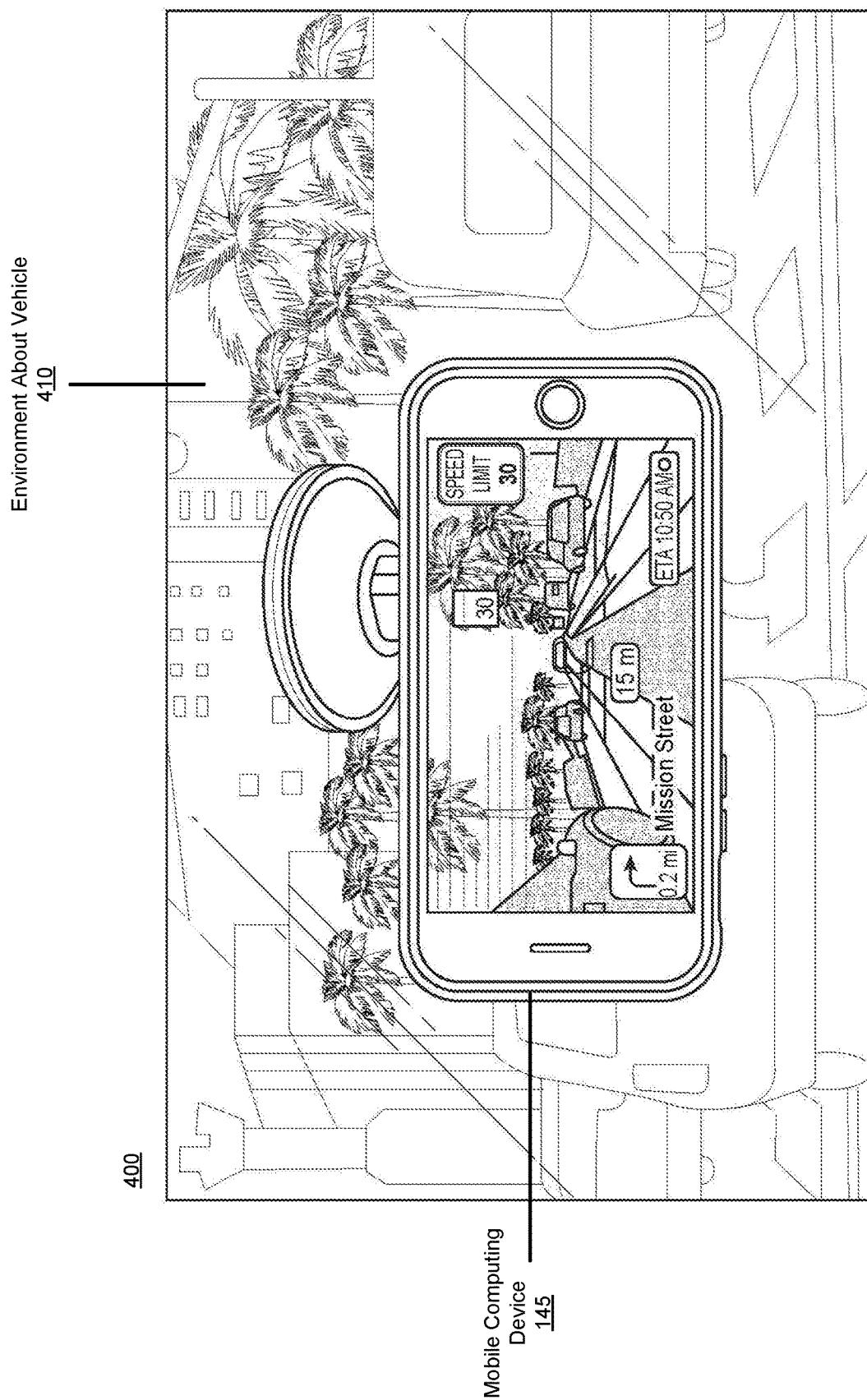
FIG. 4 illustrates an example of a video capture device capturing an environment about a vehicle, in accordance with some embodiments.

FIG. 4 illustrates an example of a video capture device capturing an environment about a vehicle, in accordance with some embodiments. In the example view 400, the mobile computing device 145 is a smartphone shown mounted onto the windshield of a car. The camera 147 (not shown in FIG. 4) is integrated with the mobile computing device 145 and captures a view of the environment about the vehicle 410. The orientation of the camera 147 may not be parallel to the ground plane at the location of the mobile computing device 145. For example, the mobile computing device and the camera 147 may be tilted downwards or upwards relative to the ground plane. In the example view 400, the mobile computing device 145 is displaying the image frames depicting the environment 410 being captured by the camera 147 in real-time, with graphical overlays, but this may not always be the case, according to some embodiments. While the mobile computing device 145 with the camera 147 is coupled to the windshield of the vehicle, the camera 147 may be coupled in different manner to an associated vehicle. In other embodiments, the camera 147 is not associated with a vehicle.

Figure 5A:
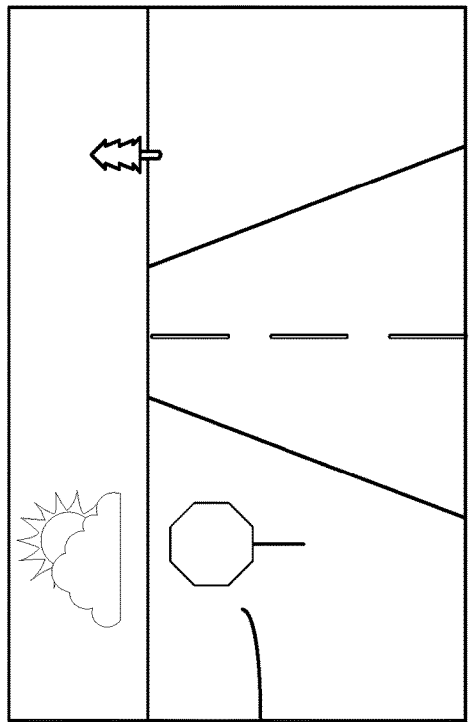
FIGS. 5A and 5B illustrate an example of an object depicted in an image frame of a video and the corresponding location of the object on a map portion, in accordance with some embodiments.
Figure 5B:
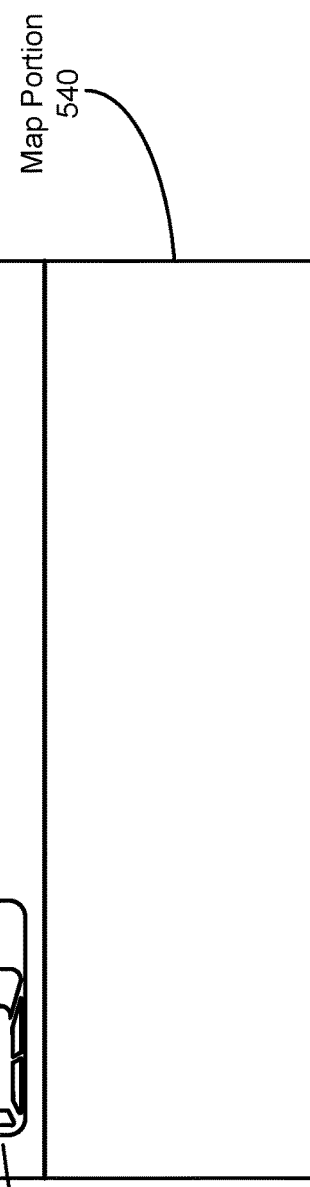

FIG. 5A illustrates an example of an object depicted in an image frame of a video and FIG. 5B illustrates the corresponding location of the object on a map portion, in accordance with some embodiments. The image frame 510 depicts a scene including an object 520. In this example, the object 520 is a stop sign that is captured by a camera that is mounted to a windshield of a vehicle 530 (e.g., a car), similarly to the mobile computing device 145 shown in FIG. 4. The image frame 510 may be an image frame capturing the field of view of the camera 147 integrated with the mobile computing device 145, as depicted in FIG. 4, according to some embodiments. The map portion 540, including the geographic location of the object 525 may be part of a map tile, for example, to be displayed on the mobile computing. In some embodiments, the map portion 540 is displayed on a mobile computing device as part of a graphical user interface (GUI) of a navigation application.

The video detection engine may receive the video including the image frame 510 and determine the object pixel coordinates for the object 520 in each image frame it appears in. The coordinates engine 330 receives the object pixel coordinates and the geographic location of the camera (or vehicle 530). The coordinates engine 330 determines the geographic location of the object 525 based on the received object pixel coordinates, the geographic location of the camera, and the angular orientation of the camera. The map portion 530 shows a vicinity of the vehicle 530, including the geographic location of the vehicle 530 and the geographic location of the object 525.

Figure 6B:
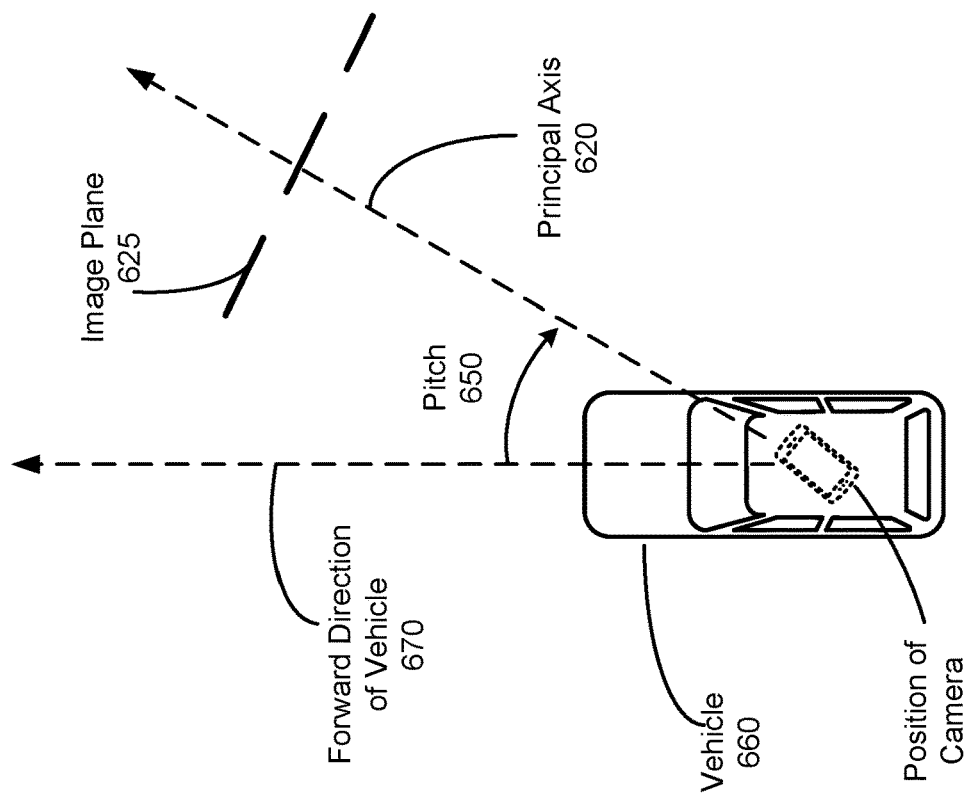
FIGS. 6A-6B illustrate an angular orientation of a video capture device, in accordance with some embodiments.
Figure 6A:
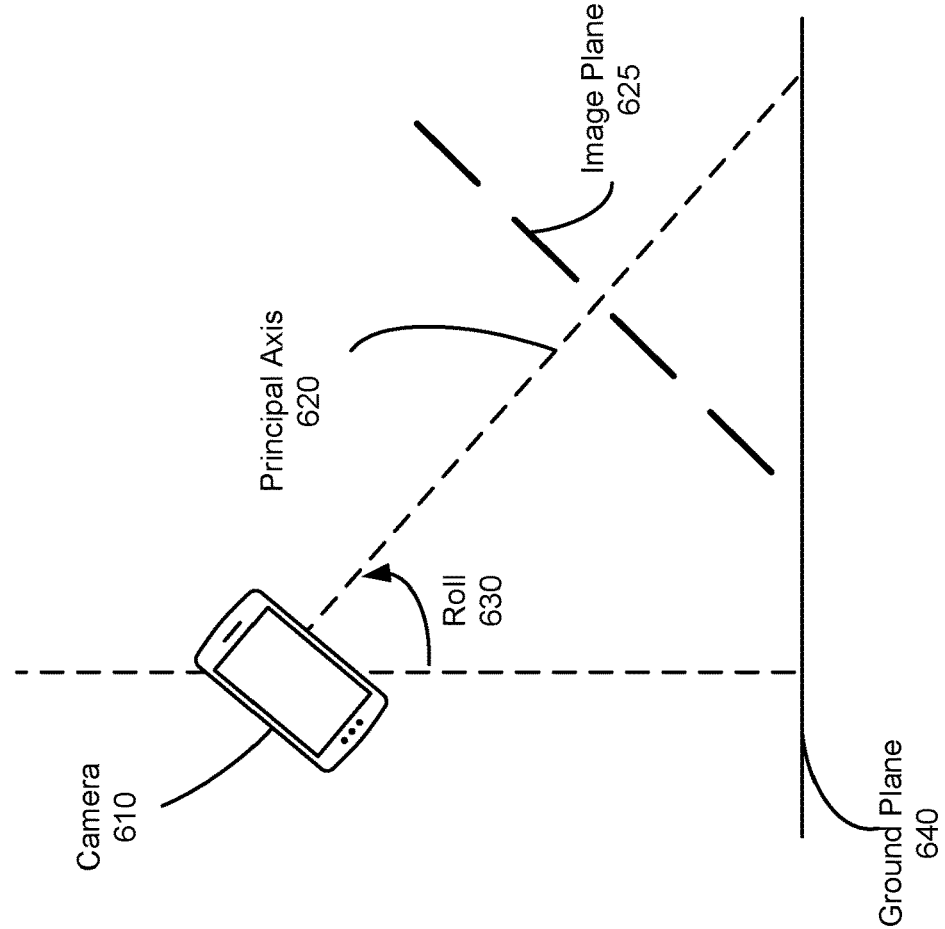

FIGS. 6A-6B illustrate an angular orientation of a video capture device (camera 610), in accordance with some embodiments. The angular orientation of the camera 610 is based on the orientation of the principal axis 620 of the camera 610. The principal axis 620 intersects both the location of the camera 610 and the focal point of the camera. The principal axis indicates the center of the field of view of the camera 610 and also intersects both the center of the image plane 625 and the center of the image frames of the video capture by the camera 610. The image plane 625 is perpendicular to the principal axis 620, and the distance between the image plane 625 and the focal point of the camera 610 is equal to the focal length of the camera 610.

Angular orientation coordinates include a roll coordinate indicating the roll angle 630 between the principal axis 620 and the ground plane 640 and a pitch coordinate indicating the pitch angle 650 between the principal axis 620 and a forward direction 670. In some embodiments, when the camera 610 is associated with a vehicle 660, the pitch angle 650 is between the principal axis 620 and a forward direction of the vehicle 670. FIG. 6A shows the roll angle 630 of the camera 610. FIG. 6B shows the pitch angle 650 of the camera 610 that is associated with the vehicle 660. The angular orientation of the camera 610 may be determined by the coordinates engine 330 based on tracks generated by the tracks engine 340, according to some embodiments. In other embodiments, the angular orientation of the camera 610 is determined by another method or received by the coordinates engine 330 from an external source. For example, a sensor on the mobile computing device 145 may provide the angular orientation of the camera 610. The angular orientation of the camera 610 is used by the coordinates engine 330 to determine the geographic positions of objects depicted in videos captured by the camera 610. In some embodiments, the angular orientation coordinates of the camera 610 may also include a yaw coordinate indicating a yaw angle for the rotation of the camera 610, relative to an upward direction.

Figure 7:
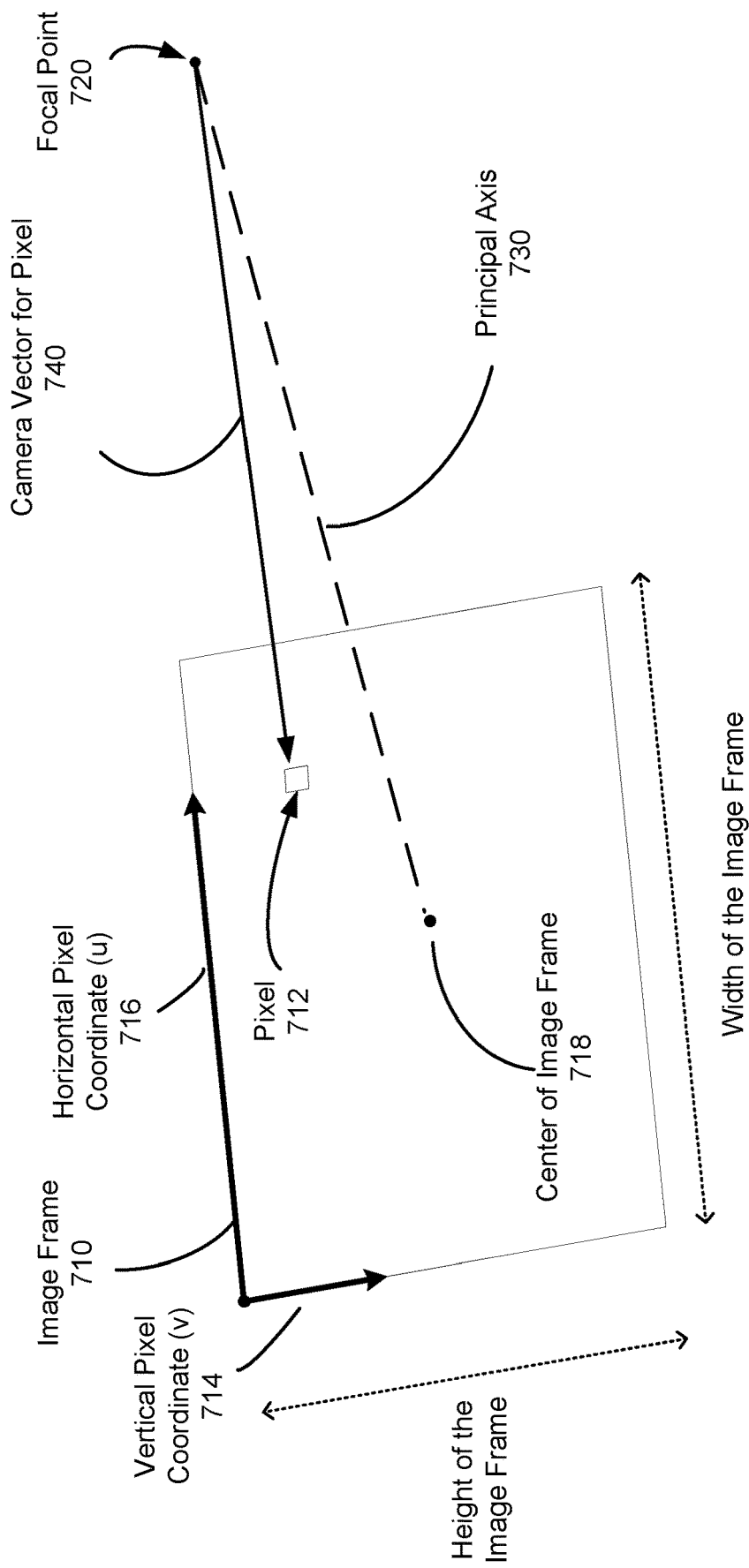
FIG. 7 illustrates pixel coordinates of a pixel in an image frame of a video, in accordance with some embodiments.

FIG. 7 illustrates pixel coordinates of a pixel in an image frame of a video, in accordance with some embodiments. The image frame 710 includes a plurality of pixels including a pixel 712. The pixel coordinates for a pixel 712 include a vertical pixel coordinate 714 indicating a distance from the center of the image frame 718 and a horizontal pixel coordinate 716. The vertical pixel coordinate 714 may be a value indicating a row of pixels. Similarly, the horizontal pixel coordinate 716 may be a value indicating a column of pixels. In other embodiments, the pixel coordinates have units different from the rows and columns. For example, the pixel coordinates may have units that indicate a length (e.g., centimeters, meters, kilometers, or miles). The pixel coordinates (0, 0) correspond to the top left corner of the image frame. The center of the image frame 518 corresponds to the pixel coordinates $$\left(\frac{w}{2}, \frac{h}{2}\right),$$

where w is the width of the image frame and the h is height of the image frame. The pixel 712, has pixel coordinates (u, v), where u is the horizontal pixel coordinate 716 for the pixel 712 and v is the vertical pixel coordinate 714 for the pixel 712.

The image frame 710 is parallel to the image plane and overlaps the image plane. The focal point 720 of the camera is at a distance away from the image plane and the image frame 710 equal to the focal length. In some embodiments, the focal length has units of pixels. In other embodiments, the focal length has units of length. Each pixel may also be described by camera vector coordinates, where the camera vector coordinates (x, y, z) are 3-dimensional coordinates that indicate vectors from the focal point 720 of the camera and ending at the camera vector coordinate (x, y, z). The focal point 720 of the camera has camera vector coordinates of (0, 0, 0). The camera vector coordinates include a horizontal vector coordinate (x), a vertical vector coordinate (y), and a distance coordinate (z). In some embodiments, the x-axis is perpendicular to a forward direction associated with the camera (e.g., a forward direction of a vehicle associated with the camera), the y-axis is parallel with the forward direction, and the z-axis is normal to a ground plane in a vicinity of the camera. The axes of the camera vector coordinate system may be parallel to a relational coordinate system, as discussed below with respect to FIG. 8.

According to some embodiments, the camera vector 740 for the pixel 712 is the sum of three vectors. If the pixel 712 has pixel coordinates (u, v), the three vectors are:

$$\left(u - \frac{w}{2}\right)\vec{u}, \left(v - \frac{h}{2}\right)\vec{v},$$

and (f)$\vec{f}$, where $\vec{u}$ is a unit vector originating at the center of the image frame 718 and corresponding to the horizontal direction in the image plane defined by the image frame 710, $\vec{v}$ is a unit vector originating at the center of the image frame 718 and corresponding to the vertical direction in the image plane, $\vec{f}$ is a unit vector originating at the focal point 720 and corresponding to a direction from the focal point 720 to the center of the image 718, and f is the focal length of the camera. The unit vector $\vec{f}$ may be determined based on the roll angle of the camera. The camera vector 740 for the pixel 712 defined by the camera vector coordinates is shown in FIG. 7. In some embodiments, the camera vector coordinates have units of length (e.g., centimeters, meters, kilometers, or miles). In this case, the values of u, v, w, f, and h may also have units of length. In other embodiments, the camera vector coordinates, u, v, w, f, and h have other units. For example, the camera vector coordinates, u, v, w, f, and h may have units of pixels. In some embodiments, a normalized camera vector with length of 1 is used to indicate a direction from the focal point 720 to the pixel 712.

Figure 8:
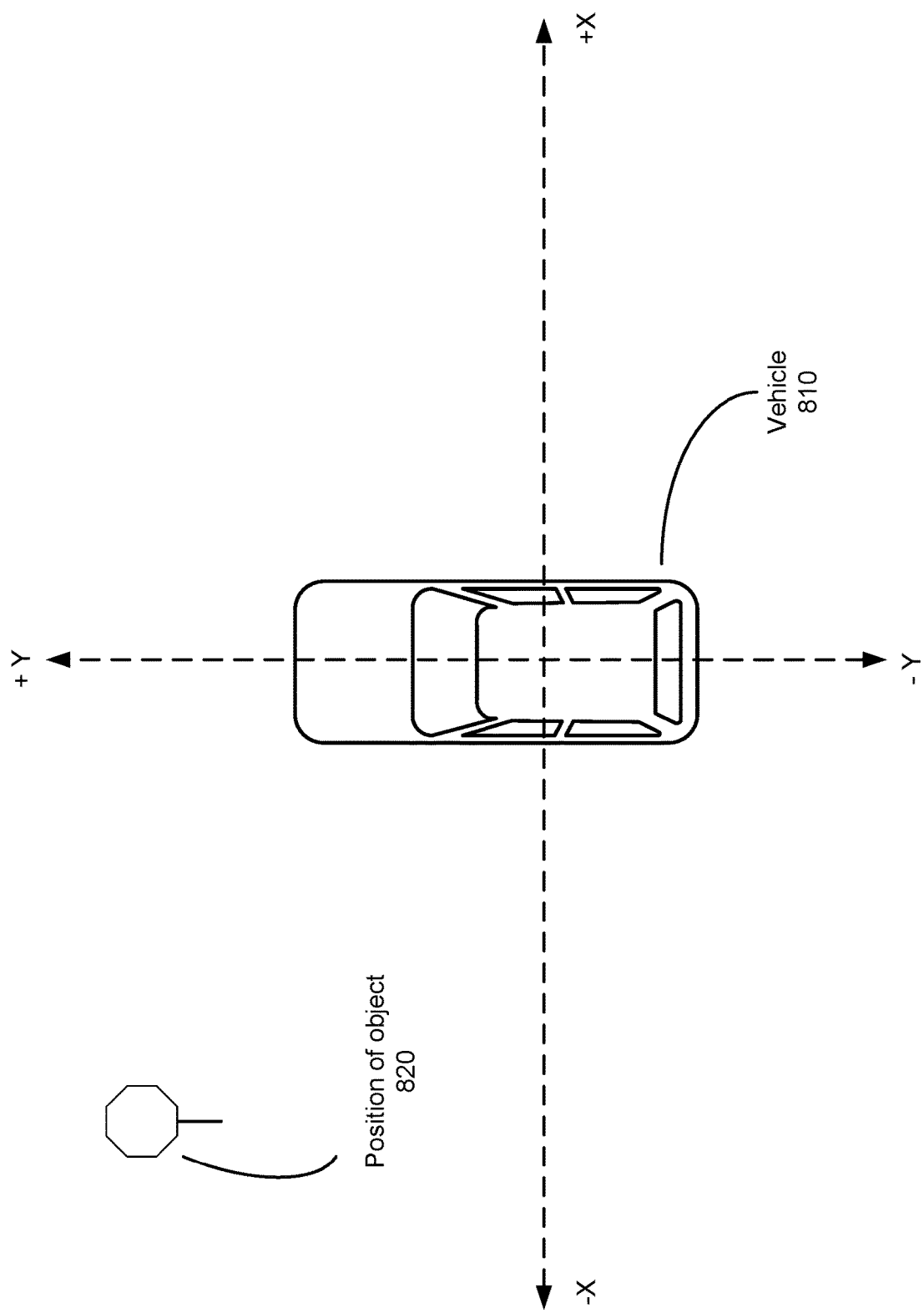
FIG. 8 illustrates a position of an object in a relational coordinate system, in accordance with some embodiments.

FIG. 8 illustrates a position of an object in a relational coordinate system, in accordance with some embodiments. In the example of FIG. 8, the camera is associated with a vehicle 810 (e.g., physically mounted on its windshield), and the relational coordinate system may also be referred to as a "vehicle coordinate system" herein. The relational coordinates, also referred to as "vehicle coordinates" herein, indicate a 3-dimensional position relative to a central position. In the example of FIG. 8, the central position is the position of the vehicle 810 associated with the camera. The relational coordinates include a forward coordinate, a lateral coordinate, and a height coordinate. The position of the object 820 is indicated by the relational coordinates (X, Y, Z), where X is the lateral coordinate, Y is the forward coordinate, and Z is the height coordinate. The central position, which is the position of the vehicle 810 in FIG. 8, has coordinates (0, 0, 0). In some embodiments, the axes of the relational coordinate system are parallel to the axes of the camera vector coordinate system.

The X-Y plane of the relational coordinate system is approximately the ground plane of the Earth at the vicinity of the central position. In the example of FIG. 8, a positive forward coordinate (+X) indicates a position in front of the vehicle 810, and a positive lateral coordinate (+Y) indicates a position to the right of the vehicle 810 with respect to the forward direction. A positive height coordinate (+Z) indicates a position at a higher elevation than the vehicle 810. In some embodiments, the relational coordinates have units of length (e.g., centimeters, meters, kilometers, or miles). In some embodiments, the relational coordinates have the same units as the camera vector coordinates.

Figure 9:
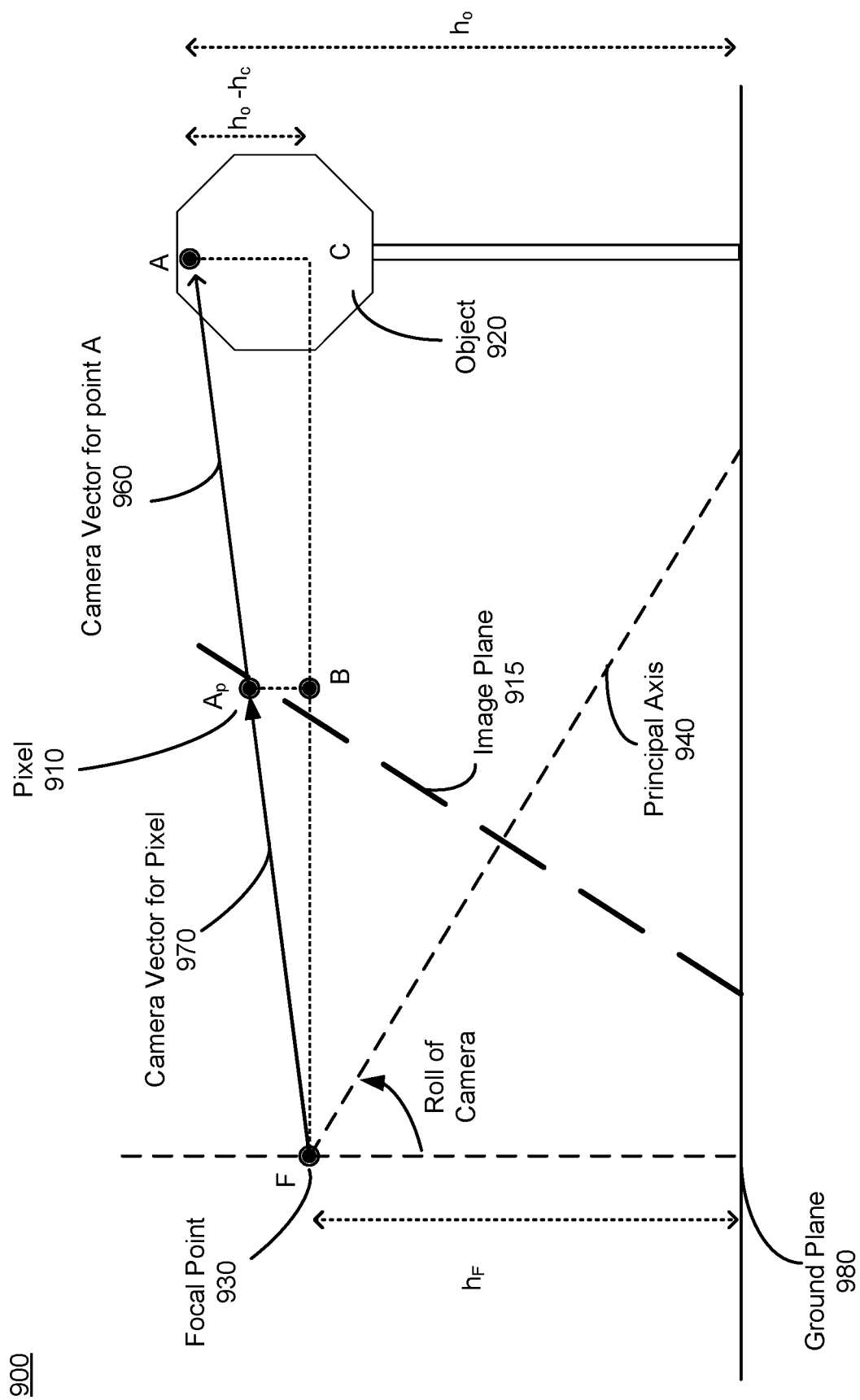
FIG. 9 is a diagram illustrating geometry for determining relational coordinates for an object in an image frame of a video, in accordance with some embodiments.

FIG. 9 is a diagram illustrating geometry for determining relational coordinates for an object in an image frame of a video, in accordance with some embodiments. The diagram 900 includes the point $A_p$, which indicates the position of a pixel 910 in the image frame (along the image plane 915). The pixel 910 depicts a top portion of an object 920 and corresponds to a point A in the real-world environment. The coordinates engine 330 receives the position of the camera, the angular orientation of the camera (including the roll angle), and a size measure of the object indicating a dimension of the object size (e.g., height). In some embodiments, the coordinates engine 330 receives a distance to the object instead of or in addition to the size measure of the object. In the example of FIG. 9, the received size of the object is a height of the object ($h_o$). In other embodiments, the coordinates engine 330 may receive a different value for the size of the object, such as a width of the object. The height of the object may be received from the video detection engine 310, which approximates the height of the object based on an identified type of object corresponding to the object 920. For example, if the video detection engine 310 determines that the object 920 is a stop sign, the video detection engine 310 may approximate the height of the stop sign to be a standard height for stop signs in an area corresponding to the location of the camera. In other embodiments, a user may submit the height of the object.

In some embodiments, the coordinates engine 330 determines the distance to the object 920 from the focal point 930 based on the image frames and the elevation of the focal point of the camera ($h_f$). If the object 920 is on the ground plane 980, the coordinates engine 330 determines the distance from the focal point 930 to a base point where the object 920 touches the ground plane based on the elevation of the focal point ($h_f$) and the angle between the camera vector for a pixel corresponding to the base point and the normal to the ground plane. The coordinates engine determines this angle based on the roll angle of the camera. The coordinates engine 330 may also determine the distance along the ground plane from the focal point 930 to the object 920, the height of the object $h_o$, and the geographic location of the object 920 based in part on the determined distance from the focal point 930 to the base point, according to some embodiments.

The point F corresponds to a location of the focal point 930 of the camera. In some embodiments, the elevation of the focal point of the camera ($h_f$) is determined based on the roll angle of the camera and the position of the camera (including the elevation of the camera). In some embodiments, when the camera is associated with a vehicle, the geographic location of the vehicle is received by the coordinates engine 330, and the position of the camera is approximated to be the same as the location of the vehicle. In other embodiments, the position of the camera relative to the vehicle is received by the coordinates engine 330.

Since the right triangle formed by the points F, $A_p$, and B is similar to the right triangle formed by the points F, A, and C, the camera vector coordinates for point A can be determined based on the camera vector coordinates for the pixel. According to some embodiments, the camera vector 960 for point A is given by the equation:

$$\vec{FA} = s' \vec{FA_p}, \quad\quad\quad 1)$$

where $\vec{FA}$ is the camera vector 960 for point A, $\vec{FA_p}$ is the camera vector 970 for the pixel 910, and s' is a relational scale factor. According to some embodiments, the relational scale factor is given by the equation:

$$s' = (h_o - h_f)/(h_p), \quad\quad\quad 2)$$

where $h_p$ is the elevation of the point $A_p$ relative to the ground plane 980 in the vicinity of the camera. In some embodiments, the elevation of the point $A_p$ ($h_p$) may be determined based on the camera vector coordinates for the pixel 910 and the roll angle of the camera. Since the camera vector coordinates for the pixel 910 is are known based on the pixel coordinates of the pixel 910, the camera vector coordinates for point A can be determined using equation 1 and equation 2.

The relational coordinates for point A can be determined based on the determined camera vector coordinates for point A. The relational coordinates ($X_f$, $Y_f$, $Z_f$) for the focal point 930 are determined based on the received position of the camera, relative to the central location (e.g., the location of the vehicle associated with the camera). The relational coordinates for the point A are then determined by adding the camera vector for point A 960 to a vector originating at the central location and ending at the focal point 930. For example, if the pixel 910 has camera vector coordinates of ($x_p$, $y_p$, $z_p$), the pixel 910 has relational coordinates of ($X_f+x_p$, $Y_f+y_p$, $Z_f+z_p$). In this case, the axes of the camera vector coordinate system are parallel to the axes of the relational coordinate system. The coordinates engine 330 determines the relational coordinates for the object 920 in a video based on the received object pixel coordinates for the object 920 and the angular orientation of the camera.

Determining Geographic Location

Figure 10:
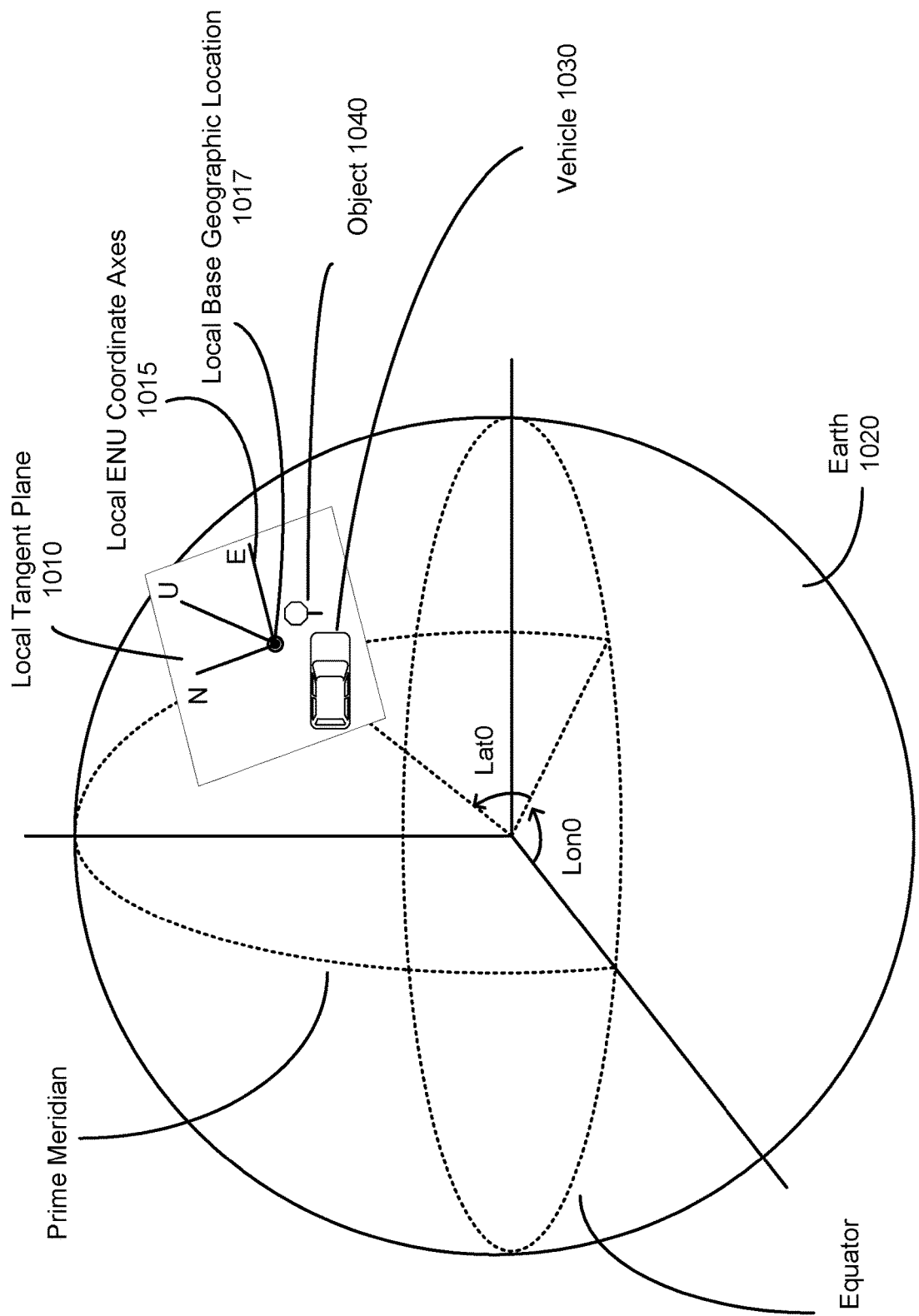
FIG. 10 illustrates a position of an object in a local East, North, Up (ENU) coordinates system, in accordance with some embodiments.

FIG. 10 illustrates a position of an object in a local East, North, Up (ENU) coordinates system, in accordance with some embodiments. The local ENU coordinates indicate a position relative to a local tangent plane 1010 that is tangent to the surface of the earth at a geographic location. The local base geographic location 1017 has the geographic latitude and longitude coordinates of (Lat0, Lon0) and is defined as the origin of the local ENU coordinate axes 1015. The local tangent plane 1010 and the local ENU coordinate axes 1015 for the local tangent plane 1010 are shown relative to a representation of the Earth 1020. In some embodiments, by using local ENU coordinates, calculations of the geographic location of objects detected in a video can be performed using vector geometry and cartesian coordinates.

The ENU coordinates of the vehicle 1030, i.e. the central location in the example of FIG. 10, are determined based on the received geographic coordinates of the vehicle 1030 by the coordinates engine 330, according to some embodiments. In some embodiments, the local ENU coordinates of the vehicle 1030 are determined based on a solution to the inverse geodetic problem. For example, if the geographic coordinates of the vehicle 1030 are known, the local ENU coordinates of the vehicle 1030 may be determined using a solution of the inverse geodetic problem for a point corresponding to the local base geographic location 1017 and a point corresponding to the geographic location of the vehicle 1030. In other embodiments, the local ENU coordinates of the vehicle 1030 are received by the coordinates engine 330 from an external source, without the need for the coordinates engine 330 to calculate the local ENU coordinates. For example, the local ENU coordinates of the vehicle 1030 may be received from the database 120 included in the electronic map data 130.

The coordinates engine 330 receives the (clockwise) azimuthal angle between the forward direction of the vehicle 1030 and the local North axis (labeled as N in FIG. 10). Based on the local ENU coordinates of the vehicle 1030, the azimuthal angle, and the determined relational coordinates of the object 1040, the coordinates engine 330 determines the local ENU coordinates of the object 1040.

The coordinates engine 330 then determines the geographic latitude and longitude coordinates of the object 1040, based on the local ENU coordinates of the object 1040. In some embodiments, the local ENU coordinates of the object 1040 are determined based on a solution to the direct geodetic problem. For example, the coordinates engine may first determine the distance from the local base geographic location 1017 to the object 1017 in the local ENU coordinate system. The coordinates engine 330 may also determine the azimuthal angle between the line extending from the local base geographic location 1017 and the object 1017 in the local ENU coordinate system. The coordinates engine 330 then determines the local ENU coordinates of the object 1040, based on a solution of the direct geodetic problem for a point corresponding to the local base geographic location 1017, the determined distance, and the determined azimuthal angle.

In alternate embodiments, the coordinates engine 330 receives the geographic coordinates of the object 1017 that appears in the video and the geographic coordinates of the vehicle 1030. The coordinates engine 330 determines the pixel coordinates of the object 1017 in the image frames of the video based on the received geographic coordinates of the object 1017 and the geographic coordinates of the vehicle. The coordinates engine 330 first determines the local ENU coordinates of the object 1017 based on the geographic coordinates of the object 1017 and the geographic coordinates of the vehicle 1030. Then, the coordinates engine 330 determines the relational coordinates of the object 1017 based on the local ENU coordinates of the object 1017 and the vehicle coordinates of the vehicle 1030. The coordinates engine 330 determines the camera vector coordinates of the object 1017 based on the relational coordinates of the object 1017. Finally, the coordinates engine 330 determines the pixel coordinates of the object 1017 based on the camera vector coordinates of the object 1017 and the angular orientation of the camera used to capture the video.

Determining the Angular Orientation of the Camera

Figure 11A:
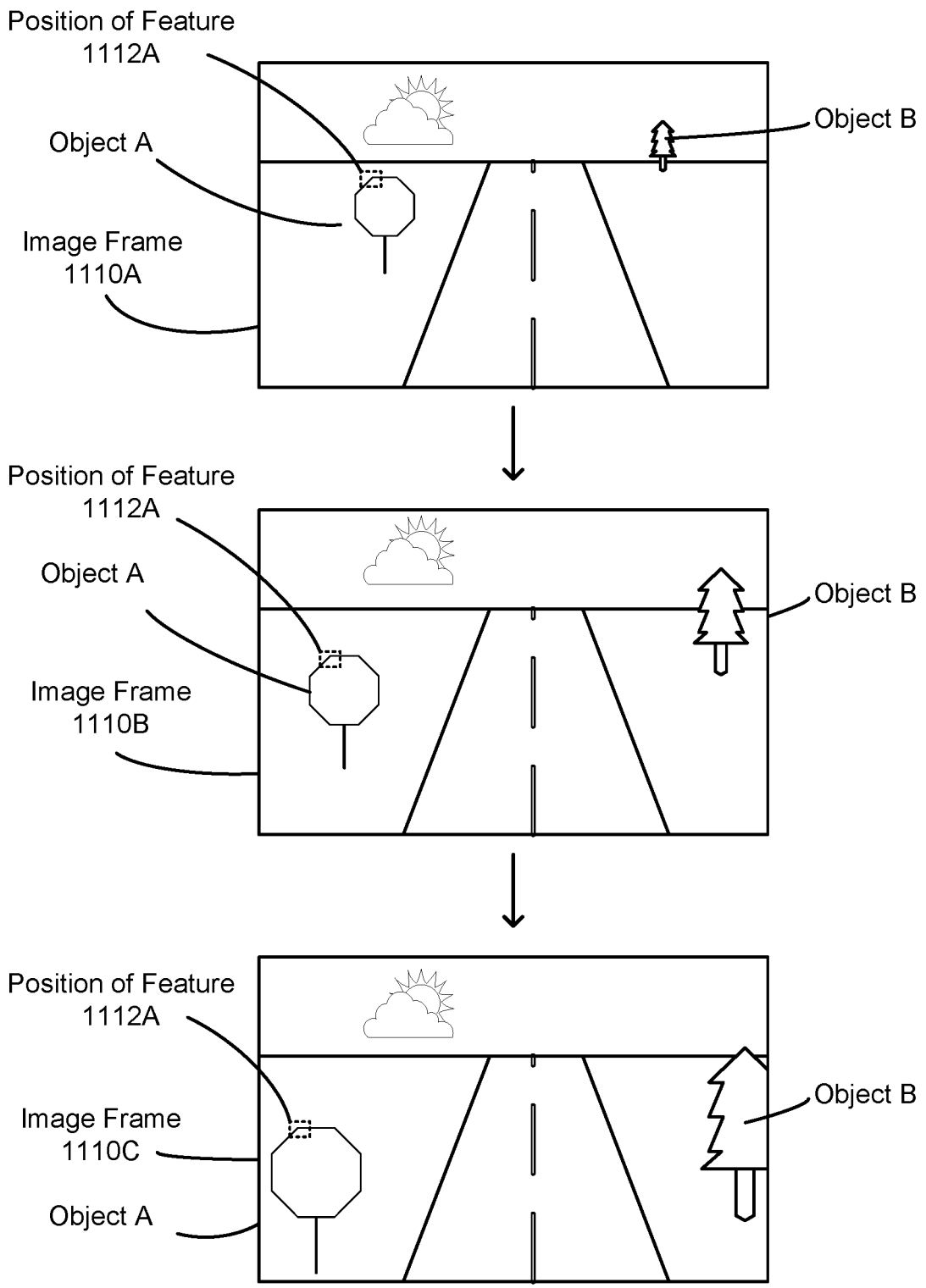
FIGS. 11A-11D illustrate an example of determining an angular orientation of a video capture device based on a series of image frames of a video, in accordance with some embodiments.

FIGS. 11A-11D illustrate an example of determining an angular orientation of a video capture device based on a series of image frames of a video, in accordance with some embodiments. FIG. 11A shows a series of image frames 1110 (1110A, 1110B, and 1110C) from a video captured by a camera, in accordance with some embodiments. Each of the image frames 1110 depicts an object A and an object B. In some embodiments, a feature of an object is detected and a location of the detected feature is determined for each image frame. For example, a corner of an object may be detected using a Shi-Tomasi detector. In FIG. 11A, the detected feature is a corner of object A. The position of the feature 1112A is determined for each of the image frames 1110. In this example, the camera is moving, with the positions of the stationary object A and the stationary object B in the image frame changing based on the motion of the camera. In some embodiments, the camera may be stationary, with objects in the video moving. The tracks engine 340 receives the object pixel coordinates for both object A and object B in each of the image frames 1110.

Figure 11B:
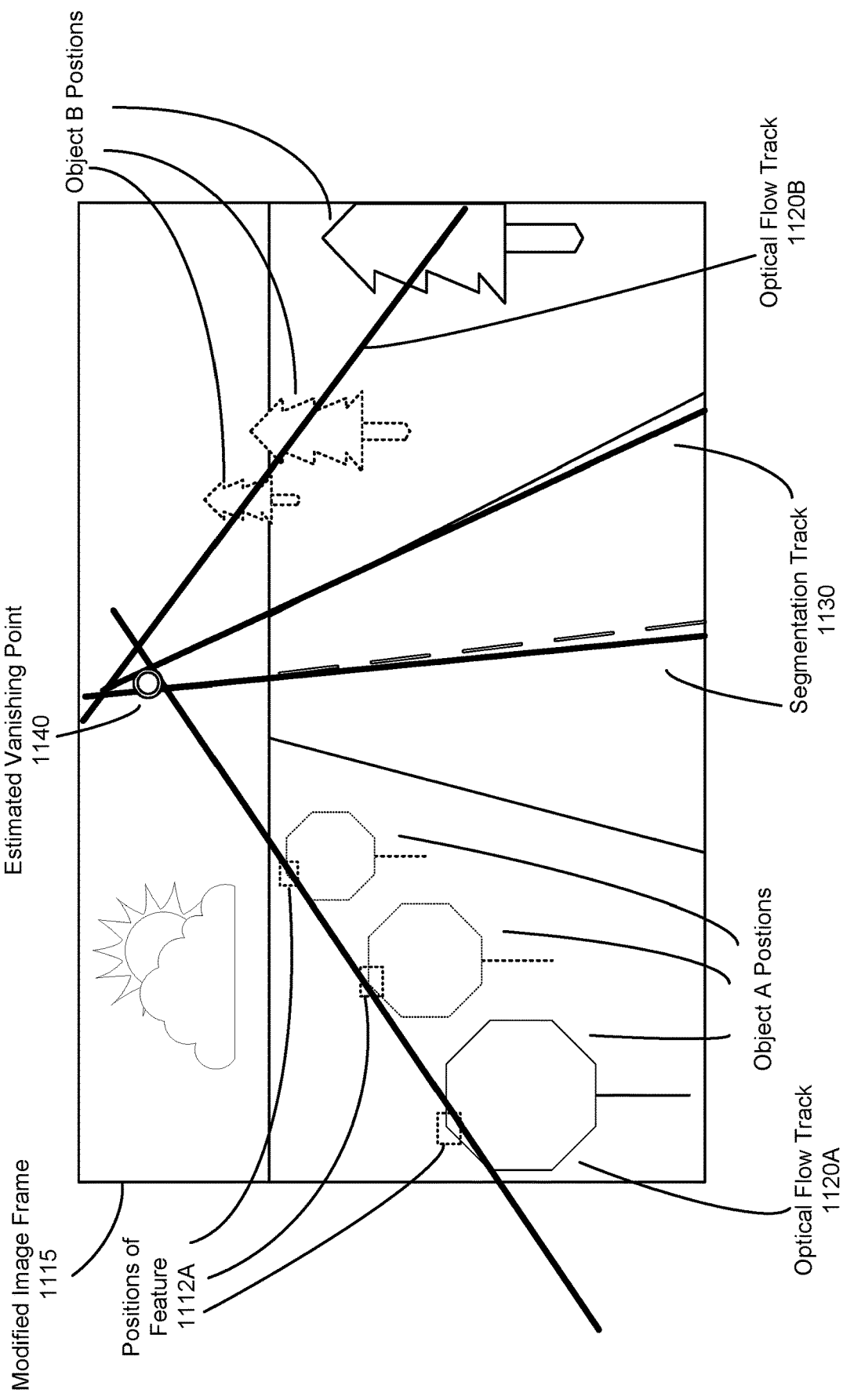

FIG. 11B shows a modified image frame 1115 with the positions of the object A, the positions of the object B, and the positions of the feature 1112A detected for the object A for each of the image frames 1110 shown, in accordance with some embodiments. The tracks engine 340 generates an optical flow track 1120A based on the optical flow of the object A and an optical flow track 1120B based on the optical flow of the object B. Each optical flow track is a straight line that approximates the optical flow of the respective object through the image frames 1110. The optical flow track 1120A corresponding to the optical flow of object A and the optical flow track 1120B corresponding to the optical flow of object B are shown in FIG. 11B overlaid on the modified image frame 1115. Each optical flow track may be determined by fitting a line to the positions of the respective object. In some embodiments, the location of the feature detected for an object in each of the image frames 1110 is used to determine the optical flow and generate the optical flow track 1120A. For example, as shown in FIG. 11B, the optical flow track 1120A is generated based on the determined optical flow for the detected feature, based on the positions of the feature 1112A in the image frames 1110. In other embodiments, the position of the respective object in each image may be estimated using another method. In some embodiments, the line is fitted based on minimizing a sum of each distance from the line to the positions of the respective object or feature. In some embodiments, the optical flow tracks are generated by using the Lucas-Kanade method to determine the optical flow of a respective object or feature. For example, a corner of an object may be detected in each of the image frames 1110 by using a Harris detector. The Lucas-Kanade method may then be used to determine the optical flow of the corner through the image frames 1110. In other embodiments, the optical flow tracks are generated using other methods. For example, the optical flow may be determined using the Horn-Schunck method, a phase correlation method, or methods using convolutional neural networks, among other methods.

The tracks engine 340 also generates segmentation tracks 1130 which correspond to objects in the video that are connected in an approximately straight line. The segmentation tracks 1130 are generated by providing the image frames 1110 to the trained segmentation model 345. The trained segmentation model 345 extracts elements in the scene of the video, such as road markup elements, and outputs the orientation of the extracted elements. The orientation is transformed to line parameters by the tracks engine 340, and the tracks engine 340 generates the segmentation tracks 1130 based on the line parameters. In the example shown in FIG. 10B, one of the segmentation tracks 1130 corresponds to a lane marker in the center of a road, and another segmentation track 1130 corresponds to a curb on the side of the road. In other examples, other objects or elements are extracted by the trained segmentation model 340.

A vanishing point 1140 is estimated based on the generated optical flow tracks 1120 (1120A and 1120B) and the segmentation tracks 1130, according to some embodiments. While a total of four tracks is shown in FIG. 10B, a different number of tracks may be generated by the tracks engine 340 for a video to estimate the vanishing point 1140. In one embodiment, the vanishing point 1140 is estimated by determining a point with a minimum sum of distances from the point to each generated track. In other embodiments, the vanishing point 1140 may be estimated using a different method. For example, the vanishing point 1140 may be estimated by averaging the points of intersection for multiple pairs of generated tracks. After the vanishing point 1140 is estimated a first time, outlier tracks at a distance from the vanishing point 1140 greater than a threshold distance may be removed. The vanishing point 1140 may then be optimized by estimating the vanishing point 1140 a second time without using the removed tracks, with the second estimate replacing the first estimate. The optimization of the estimated vanishing point 1140 may be performed more than once, in some embodiments, removing outlier tracks each time.

The camera may shake during the capture of the video, making it more difficult to identity consistent tracks. To address this, in some embodiments, the tracks engine 340 does not determine tracks during image frames where the acceleration and/or the velocity of the camera is greater than a threshold value. In further embodiments, the acceleration of the camera may be determined based on sensor data from a mobile computing device 145 associated with the camera. In other embodiments, the acceleration of the camera may be determined by other methods. For example, in some embodiments, the acceleration of the camera may be determined based on the image frames of the video, via image processing methods. According to some embodiments, performing the vanishing point estimation optimization, removing tracks that are inaccurate, and preventing the generation of tracks during periods of high acceleration or velocity, may increase the accuracy of the tracks engine 340 in estimating the vanishing point 1140. In some embodiments, the yaw angle of the camera may be determined based on an estimated horizon line of the image frames. For example, the yaw angle may correspond to an angle between the estimated horizon line and a horizontal line in an image frame.

Figure 11D:
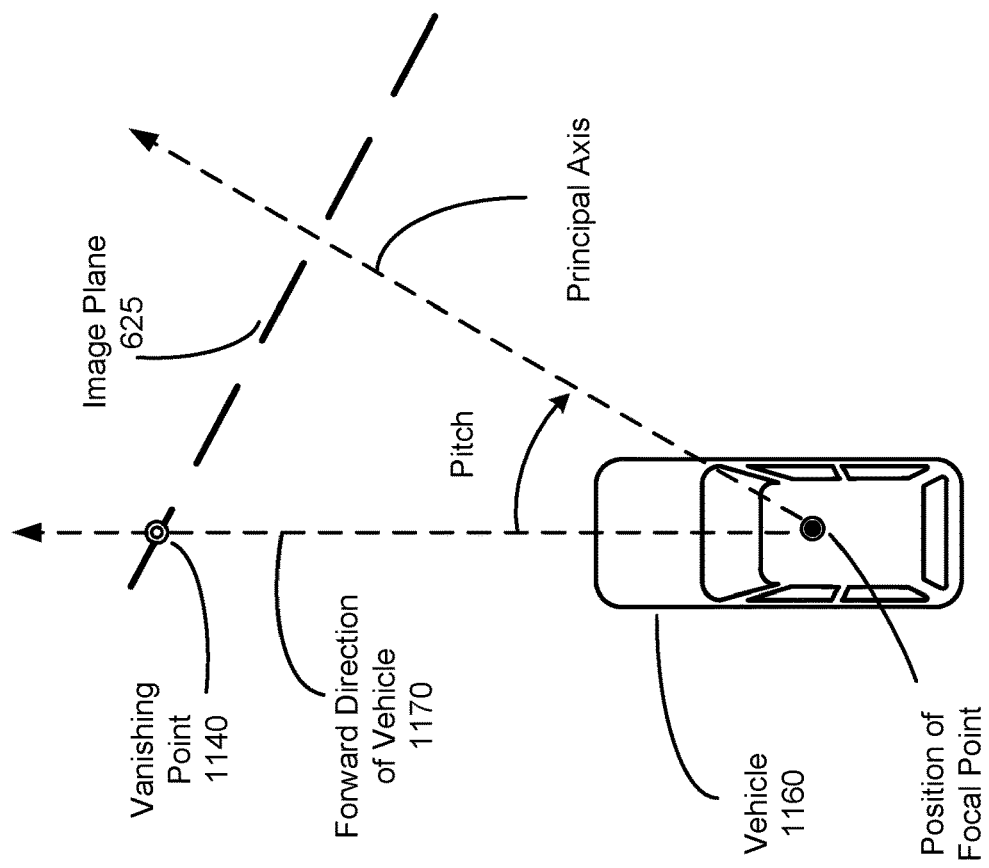
Figure 11C:
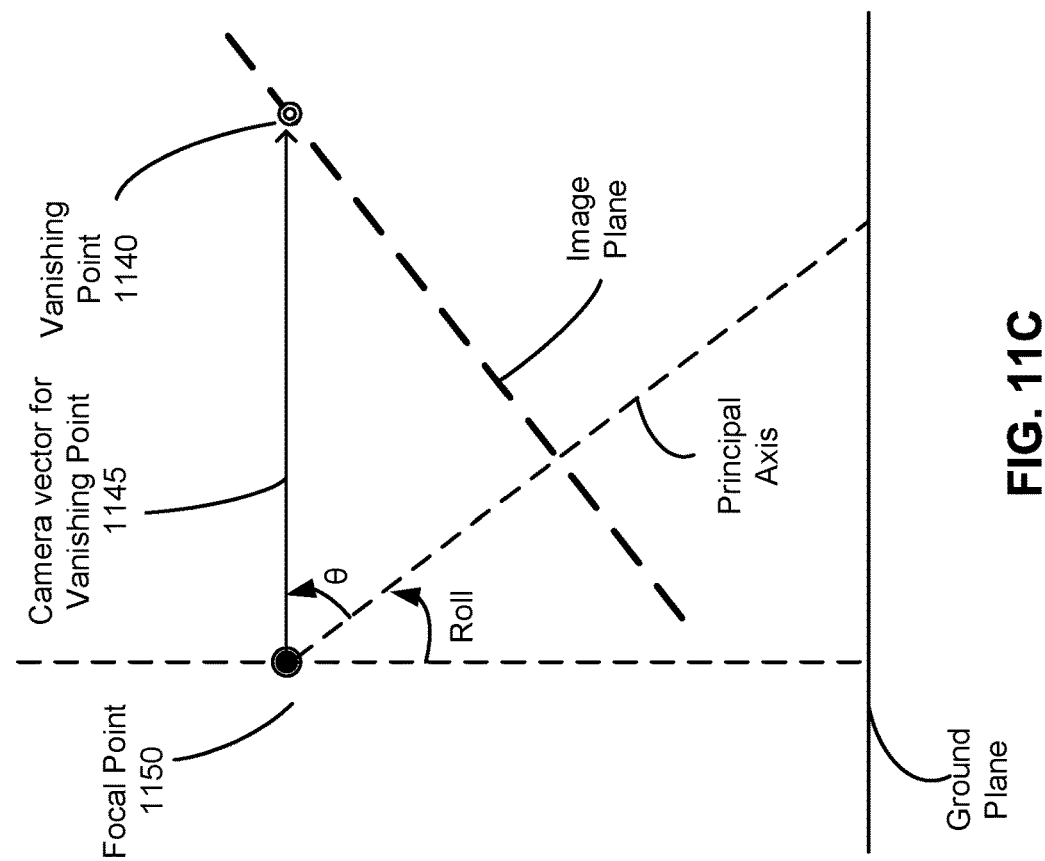

FIG. 11C is a diagram illustrating geometry used to determine the roll angle of the camera used to capture the video based on the vanishing point 1140, in accordance with some embodiments. The angle θ is a polar angle between the principal axis and the camera vector 1145, as shown in FIG. 11C, where the camera vector 1145 corresponds to the vanishing point 1140. The angle θ is determined by the coordinates engine 330 based on the pixel coordinates of the vanishing point 1140. According to some embodiments, the angle θ may equal $$\tan^{-1}\left(\frac{v_v - \frac{h}{2}}{f}\right),$$

where f is the focal length, $v_v$ is the vertical pixel coordinate of the vanishing point 1140, and h is the height of the image frame. In some embodiments, $v_v$, h, and f all have units of length. In other embodiments, $v_v$, h, and f have other units. For example, $v_v$, h, and f may all have units of pixels. The roll angle of the camera is determined to be equal to the angle θ subtracted from 90°.

FIG. 11D is a diagram illustrating geometry used to determine the pitch angle of the camera based on the vanishing point 1140, in accordance with some embodiments. The pitch angle of the camera is determined to be the pitch angle between the principal axis and the forward direction of the vehicle 1160. In the case where the vehicle 1160 is moving in the forward direction 1170, the optical flow of stationary objects, or of objects moving in parallel with the forward motion of the vehicle 1160, is used to generate the optical flow tracks 1120, and objects connected in a line parallel to the forward direction 1170 are used to generate the segmentation tracks 1130. The vanishing point 1140 may be aligned with the forward direction 1170. In particular, the projection of the camera vector 1145 into the x-z plane of the camera vector coordinate system is parallel with and overlaps the forward direction 1170. The pitch angle may then be determined based on the pixel coordinates of the vanishing point 1140. According to some embodiments, the pitch angle may equal $$-\tan^{-1}\left(\frac{u_v - \frac{w}{2}}{f}\right),$$

where f is the focal length, uv is the horizontal pixel coordinate, and h is the height of the image frame. In some embodiments, uv, w, and f all have units of length. In other embodiments, uv, w, and f have other units. For example, uv, w, and f may have units of pixels.

Figure 12:
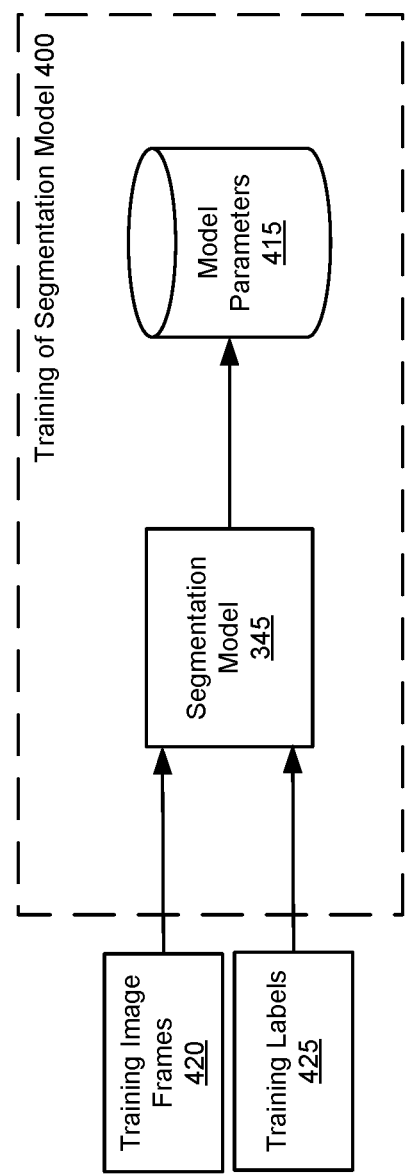
FIG. 12 is a block diagram illustrating a training of a segmentation model used to extract elements in image frames of a video for generating segmentation tracks, in accordance with some embodiments.

FIG. 12 is a block diagram illustrating a training of a segmentation model used to extract elements in image frames of a video for generating segmentation tracks, in accordance with some embodiments. In the training of the segmentation model 400, the segmentation model is trained using training image frames 420 and associated training labels 425 for each of the training image frames. The training image frames 420 includes image frames that depict objects connected in a straight line that can be used for generating the segmentation tracks 1130 in FIG. 11B. The training labels 425 may include a type of element corresponding to the objects, and an orientation of the elements in their respective image frames. In other embodiments, other training labels may be received by the segmentation model 345.

The segmentation model 345 is trained by determining model parameters 415, so as to best represent the relationship between the training image frames 420 and the associated training labels 425. For example, the segmentation model 345 may be a neural network trained using a stochastic gradient descent technique. Once the model parameter 415 are known, the trained segmentation model 345 may be used to segment elements in image frames and output the orientation of the elements in their respective image frames by accessing the determined model parameters. As discussed with respect to FIG. 11B, the output of the trained segmentation model 345 is used to generate the segmentation tracks 1130.

Figure 13:
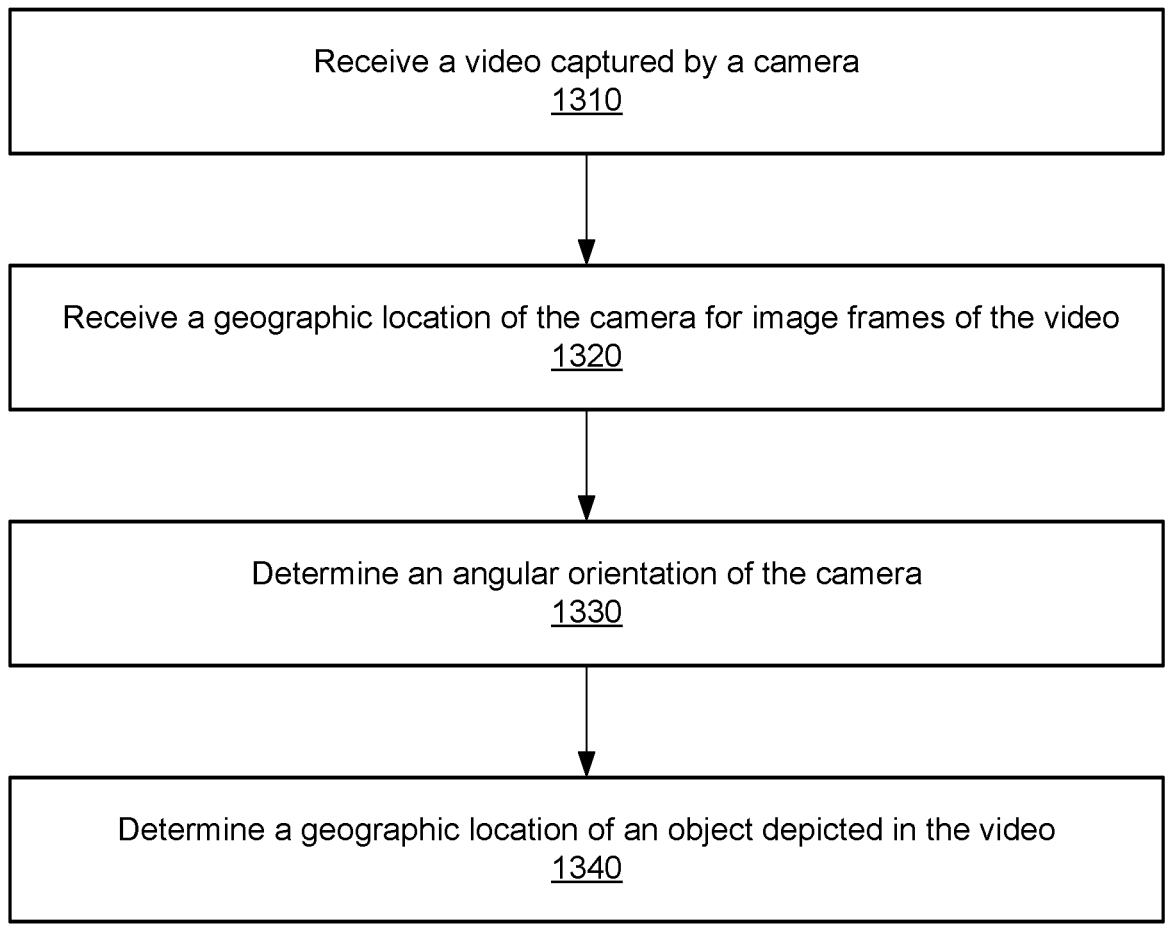
FIG. 13 is a flow chart for a method of determining a geographic location of an object depicted in a video captured by a camera, in accordance with some embodiments.

FIG. 13 is a flow chart for a method 1300 of determining a geographic location of an object depicted in a video captured by a camera, in accordance with some embodiments. The method 1300 is performed by components of the calibration module 114, according to some embodiments. The video detection engine 310 receives 1310 a video captured by a camera (e.g., camera 147). The video includes image frames depicting multiple objects. In some embodiments, the camera is in motion while the video is captured. The map engine 320 receives 1320 a geographic location of the camera for the image frames. The geographic location of the camera includes an elevation of the camera, relative to a ground plane at a vicinity of the camera, according to some embodiments. The tracks engine 340 determines 1330 an angular orientation of the camera based on the image frames of the camera. The determining 1330 of the angular orientation of the camera is discussed in further detail, with respect to FIG. 14. Based on the received geographic location of the camera, the determined angular orientation of the camera, and the image frames, the coordinates engine 330 determines 1340 the geographic location of the object depicted in the video. According to some embodiments, the determining 1340 is also based on object pixel coordinates indicating the two-dimensional position of the object within one or more of the image frames. For example, the object pixel coordinates may be determined by the video detection engine 310 by inputting the one or more of the image frames to a trained object detection model.

Figure 14:
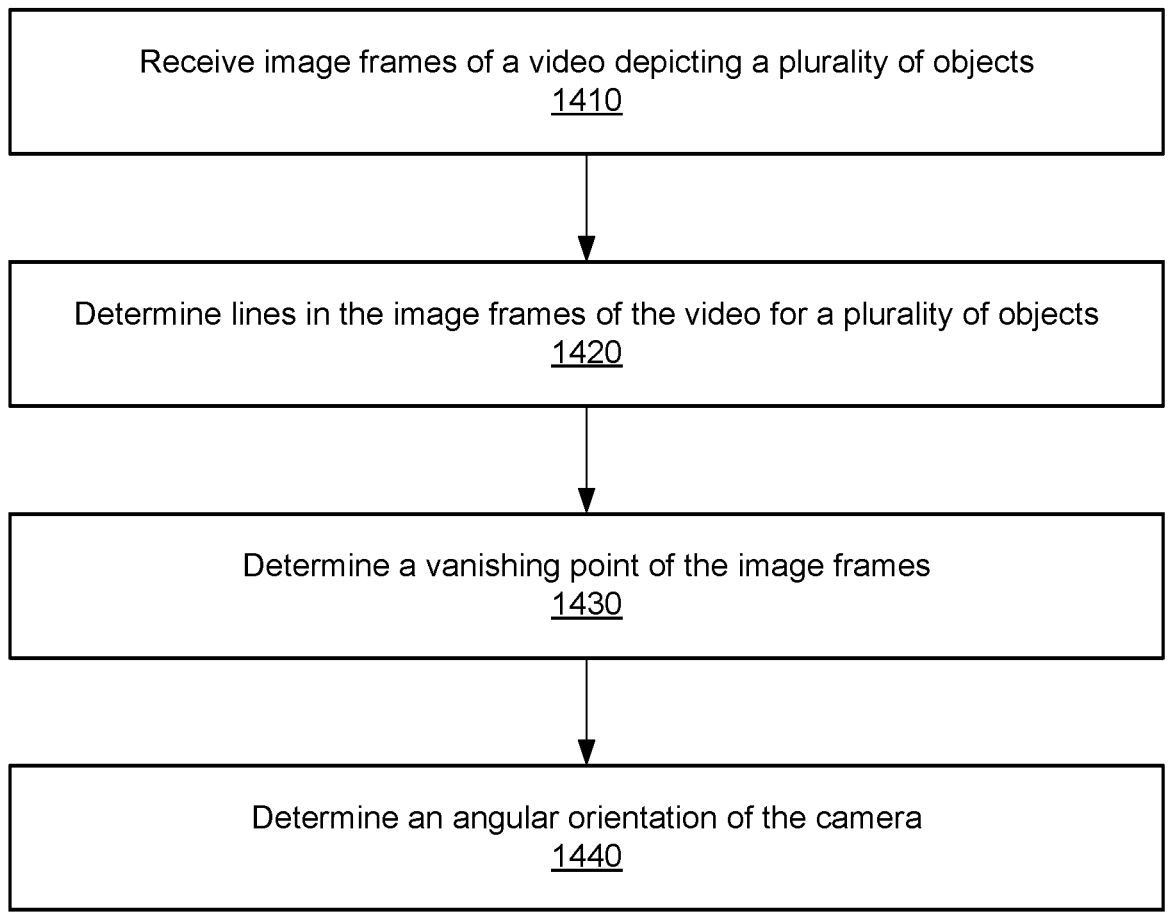
FIG. 14 is a flow chart for a method of determining an angular orientation of the camera, in accordance with some embodiments.

FIG. 14 is a flow chart of a method 1400 of determining an angular orientation of the camera, in accordance with some embodiments. The method 1400 is an embodiment of the determining 1330 the angular orientation of the camera 1330 from FIG. 13. The tracks engine 340 receives 1410 the image frames of the video depicting a plurality of the multiple objects. The tracks engine determines 1420 lines for the plurality of the multiple objects. Each of the lines corresponds to positions of one of the plurality of the multiple objects in the image frames. For example, one or more of the lines may be based on an optical flow track, as shown in FIG. 11B. One or more of the lines may be based on a segmentation track, as shown in FIG. 11B.

The tracks engine 340 determines 1430 a vanishing point of the image frames based on the lines determined 1420 for the plurality of the multiple objects. The tracks engine 1430 determines the vanishing point based on an estimated intersection point of the determined lines. In some embodiments, the estimated vanishing point is optimized to improve the accuracy of the determining 1430 of the vanishing point. The tracks engine 1440 determines the angular orientation of the camera 1440 based on the determined vanishing point and returns the determined angular orientation to the coordinates engine 330 for use in determining 1340 the geographic location of the object depicted in the video, according to some embodiments.

In some embodiments, the tracks engine 340 may reset the calibration, determining a new angular orientation of the camera. For example, if the tracks engine 340 determines that the angular orientation of the camera has changed during the video, the tracks engine 340 may determine a new angular orientation of the camera for a duration of the video after the angular orientation has changed.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method comprising:
   receiving a video comprising image frames depicting one or more objects, the video captured by a video capture device;
   receiving a geographic location of the video capture device for one or more of the image frames;
   determining an angular orientation of the video capture device based on the image frames, the determining the angular orientation comprising:
      determining an orientation of a segmentation object depicted in one or more of the image frames using a segmentation model;
      generating a segmentation track using the orientation of the segmentation object;
      determining a vanishing point of the image frames based on the determined segmentation track, and
      determining the angular orientation of the video capture device based on the determined vanishing point; and
   determining a geographic location of an object captured in the one or more of the image frames based at least on the received geographic location of the video capture device, the determined angular orientation of the video capture device, and respective two-dimensional positions of the object captured in the one or more of the image frames.

2. The computer-implemented method of claim 1, further comprising:
   determining an optical flow of the segmentation object through the image frames based on the image frames and a two-dimensional position of the segmentation object in the image frames; and generating the segmentation track based on the determined optical flow.

3. The computer-implemented method of claim 1, wherein the segmentation object corresponds to a straight line.

4. The computer-implemented method of claim 1, wherein the segmentation object is a road marker.

5. The computer-implemented method of claim 1, wherein identifying the segmentation object comprises:

inputting the one or more of the image frames to the segmentation model to determine one or more output features of the segmentation object and a corresponding output orientation for each of the one or more output features;

identifying the segmentation object based on the one or more output features; and determining the orientation of the segmentation object based on the corresponding output segmentation orientation for each of the one or more output features.

6. The computer-implemented method of claim 5, wherein the segmentation model comprises:

a set of model parameters trained using a set of training image frames of a training video and a set of training labels, each training label corresponding to one of the set of training image frames; and a function relating one of the image frames and the model parameters to an output feature of a training segmentation object and a corresponding output segmentation orientation for the output feature of the training segmentation object.

7. The computer-implemented method of claim 1, wherein the vanishing point is determined based on an estimated point of intersection of the segmentation track and one or more additional segmentation tracks corresponding to one or more additional segmentation objects depicted in one or more of the image frames.

8. The computer-implemented method of claim 7, wherein the estimated point of intersection for the segmentation track and the one or more additional segmentation tracks is based on a point with a minimum sum of distances from each of the segmentation track and the one or more additional segmentation tracks.

9. The computer-implemented method of claim 7, further comprising:

optimizing the estimated point of intersection at least once, the optimizing comprising:

identifying a new set of segmentation tracks, each of the new set having a distance that is less than a threshold distance; and determining a new estimated point of intersection for the new set of segmentation tracks, wherein the vanishing point is determined based on the new estimated point of intersection.

10. The computer implemented method of claim 1, wherein the two-dimensional positions of the object captured in the one or more of the image frames is determined by inputting the one or more image frames to an object detection model.

11. The computer-implemented method of claim 1, further comprising for each image frame of a plurality of the one or more image frames:

determining sets of camera vector coordinates for the object captured in the one or more image frames based on the two-dimensional positions of the object within the one or more image frames, each set of camera vector coordinates indicating a vector that originates at a focal point of the video capture device and ending at a three-dimensional position of the object relative to the focal point, and determining sets of relational coordinates for the object captured in the one or more image frames based on the determined sets of camera vector coordinates for the object, each set of relational coordinates indicating a three-dimensional position of the object relative to a central location and a forward direction associated with the video capture device.

12. The computer implemented method of claim 11, further comprising:

determining sets of local east, north, up (ENU) coordinates for the object captured in the one or more image frame based on the determined sets of relational coordinates and the orientation of the forward direction, relative to a local North direction of a local tangent plane in a vicinity of the video capture device, each set of local ENU coordinates indicating a position in the local tangent plane, wherein the determining the geographic location of the object captured in the one or more images frames is based on the determined sets of local ENU coordinates.

13. The computer implemented method of claim 1, wherein the angular orientation of the video capture device is defined by a roll coordinate indicating a roll angle relative to a ground plane in a vicinity of the video capture device and a pitch coordinate indicating a pitch angle relative to a forward direction.

14. The computer implemented method of claim 1, further comprising:

receiving a geographic location and a forward direction of a vehicle associated with the video capture device, wherein the received geographic location of the video capture device is relative to the geographic location of the vehicle, and the angular orientation of the video capture device includes a pitch angle relative to the forward direction of the vehicle.

15. The computer implemented method of claim 1, wherein the received geographic location of the video capture device includes an elevation of the video capture device relative to a ground plane in a vicinity of the video capture device.

16. The computer implemented method of claim 1, wherein the video capture device is moving relative to a surface of the Earth.

17. A non-transitory computer readable storage medium storing executable instructions that, when executed by one or more processors, cause the one or more processors to perform steps comprising:

receiving a video comprising image frames depicting one or more objects, the video captured by a video capture device; and determining an angular orientation of the video capture device based on the image frames, the determining the angular orientation comprising:

identifying a segmentation object depicted in one or more of the image frames using a segmentation model, comprising:

inputting the one or more of the image frames to the segmentation model to determine one or more output features of the segmentation object and a corresponding output orientation for each of the one or more output features; and identifying the segmentation object based on the one or more output features;

determining an orientation of the segmentation object based on the corresponding output segmentation orientation for each of the one or more output features;

generating a segmentation track using the orientation of the segmentation object;

determining a vanishing point of the image frames based on the determined segmentation track, and determining the angular orientation of the video capture device based on the determined vanishing point.

18. The non-transitory computer readable storage medium of claim 17, the instructions further cause the one or more processors to perform steps comprising:

determining an optical flow of the segmentation object through the image frames based on the image frames and a two-dimensional position of the segmentation object in the image frames; and generating the segmentation track based on the determined optical flow.

19. The non-transitory computer readable storage medium of claim 17, wherein the segmentation object is a road marker.

20. The non-transitory computer readable storage medium of claim 17, the steps further comprising:

receiving a geographic location of the video capture device for the one or more of the image frames; and determining a geographic location of the segmentation object captured in the one or more of the image frames based at least on the received geographic location of the video capture device, the determined angular orientation of the video capture device, and respective two-dimensional positions of the segmentation object captured in the one or more of the image frames.

* * * * *